United States Patent
Tanaka et al.

(10) Patent No.: US 10,202,920 B2
(45) Date of Patent: Feb. 12, 2019

(54) EXHAUST GAS CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Takayoshi Tanaka, Susono (JP); Yoshihisa Shinoda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/058,428

(22) Filed: Mar. 2, 2016

(65) Prior Publication Data

US 2016/0258373 A1 Sep. 8, 2016

(30) Foreign Application Priority Data

Mar. 4, 2015 (JP) ................. 2015-042904

(51) Int. Cl.

| F01N 3/10 | (2006.01) |
|---|---|
| F02D 41/02 | (2006.01) |
| F01N 3/08 | (2006.01) |
| F01N 3/20 | (2006.01) |
| F01N 9/00 | (2006.01) |
| F02D 41/04 | (2006.01) |
| F02D 41/14 | (2006.01) |

(52) U.S. Cl.
CPC ....... *F02D 41/0295* (2013.01); *F01N 3/0814* (2013.01); *F01N 3/0842* (2013.01); *F01N 3/103* (2013.01); *F01N 3/2066* (2013.01); *F01N 9/00* (2013.01); *F02D 41/042* (2013.01); *F01N 2250/12* (2013.01); *F01N 2430/06* (2013.01); *F01N 2560/025* (2013.01); *F01N 2560/14* (2013.01); *F01N 2610/02* (2013.01); *F01N 2900/0416* (2013.01); *F01N 2900/08* (2013.01); *F01N 2900/1402* (2013.01); *F01N 2900/1602* (2013.01); *F02D 41/1475* (2013.01); *F02D 2200/0802* (2013.01); *F02D 2200/0804* (2013.01); *Y02T 10/22* (2013.01); *Y02T 10/24* (2013.01); *Y02T 10/47* (2013.01)

(58) Field of Classification Search
USPC .................. 60/285, 286, 295, 297, 301, 303
See application file for complete search history.

(56) References Cited

U.S. PATENT DOCUMENTS

| 6,220,019 B1 * | 4/2001 | Sugiura | ............. B01D 53/9431 60/284 |
|---|---|---|---|
| 6,560,960 B2 * | 5/2003 | Nishimura | ............ F01N 3/0842 123/399 |

(Continued)

FOREIGN PATENT DOCUMENTS

| CN | 103573344 A | 2/2014 |
|---|---|---|
| CN | 104279029 A | 1/2015 |
| JP | H10-231720 A | 9/1998 |

*Primary Examiner* — Binh Q Tran
(74) *Attorney, Agent, or Firm* — Hunton Andrews Kurth LLP

(57) ABSTRACT

In an exhaust gas control system for an internal combustion engine operable at a lean air-fuel ratio, after a request to stop the internal combustion engine has been issued, the internal combustion engine is operated at a stoichiometric air-fuel ratio or lower until an air-fuel ratio in an SCR catalyst becomes lower than or equal to the stoichiometric air-fuel ratio, and then supply of fuel to the internal combustion engine is stopped.

11 Claims, 12 Drawing Sheets

(56) References Cited

U.S. PATENT DOCUMENTS

| | | | | |
|---|---|---|---|---|
| 6,718,758 | B1* | 4/2004 | Suzuki | B60K 6/22 |
| | | | | 180/65.235 |
| 7,055,312 | B2* | 6/2006 | Osawa | B60W 10/06 |
| | | | | 180/65.235 |
| 7,892,508 | B2* | 2/2011 | Katoh | F01N 3/0814 |
| | | | | 422/105 |
| 8,096,111 | B2* | 1/2012 | Hoard | F01N 3/0871 |
| | | | | 60/274 |
| 8,393,140 | B2* | 3/2013 | Perry | F02D 41/0235 |
| | | | | 60/285 |
| 2004/0040283 | A1* | 3/2004 | Yasui | F02D 41/126 |
| | | | | 60/276 |
| 2014/0039778 | A1* | 2/2014 | Kerns | F02D 41/0087 |
| | | | | 701/103 |
| 2015/0013309 | A1 | 1/2015 | Upadhyay et al. | |

* cited by examiner

EXHAUST GAS CONTROL SYSTEM FOR INTERNAL COMBUSTION ENGINE

INCORPORATION BY REFERENCE

The disclosure of Japanese Patent Application No. 2015-042904 filed on Mar. 4, 2015 including the specification, drawings and abstract is incorporated herein by reference in its entirety.

BACKGROUND OF THE INVENTION

1. Field of the Invention

Embodiments of the present invention relate to an exhaust gas control system for an internal combustion engine.

2. Description of Related Art

There is known a technique for arranging an NOx storage reduction catalyst (hereinafter, also referred to as NSR catalyst) in an exhaust passage of an internal combustion engine. The NSR catalyst stores NOx contained in exhaust gas when the concentration of oxygen in exhaust gas flowing into the NSR catalyst is high, and reduces the stored NOx when the concentration of oxygen in exhaust gas flowing into the NSR catalyst is low and there is a reducing agent.

Sulfur poisoning of the NSR catalyst occurs because of a sulfur component that is contained in fuel. There is known a technique for, when there is a request to stop an internal combustion engine, actually stopping the internal combustion engine after sulfur poisoning of the NSR catalyst is eliminated (see, for example, Japanese Patent Application Publication No. 10-231720 (JP 10-231720 A)). With this technique, the internal combustion engine is caused to operate at a rich air-fuel ratio for the purpose of eliminating sulfur poisoning.

SUMMARY

An NOx selective catalytic reduction catalyst (hereinafter, also referred to as SCR catalyst) may be provided downstream of an NSR catalyst. The SCR catalyst is a catalyst that selectively reduces NOx with the use of a reducing agent. Ammonia is produced as a result of the reaction of HC or $H_2$ in exhaust gas with NOx in the NSR catalyst. The ammonia is allowed to be utilized as the reducing agent in the SCR catalyst.

In an internal combustion engine that is operating at an air-fuel ratio higher than a stoichiometric air-fuel ratio, that is, an internal combustion engine that is performing lean-burn operation, the internal combustion engine may be stopped in a state where the air-fuel ratio of the atmosphere in the SCR catalyst is a lean air-fuel ratio. In such a state, ammonia adsorbed in the SCR catalyst is oxidized by oxygen in exhaust gas, with the result that NOx is produced. The NOx may be reduced by other ammonia adsorbed in the SCR catalyst. When such reactions are repeated, the amount of ammonia adsorbed in the SCR catalyst reduces. Hereinafter, the phenomenon that the amount of ammonia adsorbed in the SCR catalyst reduces in this way is referred to as self-consumption. There is a concern that the amount of ammonia adsorbed in the SCR catalyst becomes deficient at the next start of the internal combustion engine because of the self-consumption of ammonia. Elimination of sulfur poisoning in the above-described related art is carried out through control for setting the air-fuel ratio in the NSR catalyst to a rich air-fuel ratio; however, the air-fuel ratio in the downstream SCR catalyst is not considered. Thus, at the next start of the internal combustion engine, there is a concern that the NOx purification performance of the SCR catalyst decreases because of a deficiency of ammonia adsorbed in the SCR catalyst.

Embodiments of the present invention suppress a deficiency of ammonia adsorbed in an SCR catalyst at a start of an internal combustion engine.

An aspect of embodiments of the present invention provide an exhaust gas control system for an internal combustion engine. The internal combustion engine is operable at a lean air-fuel ratio. The exhaust gas control system includes: an NOx selective catalytic reduction catalyst provided in an exhaust passage of the internal combustion engine, the NOx selective catalytic reduction catalyst being configured to adsorb ammonia and reduce NOx with the use of the adsorbed ammonia as a reducing agent; an air-fuel ratio control unit configured to change an air-fuel ratio in the internal combustion engine; and an engine stop control unit configured to, after a request to stop the internal combustion engine has been issued, until the air-fuel ratio in the NOx selective catalytic reduction catalyst becomes lower than or equal to a stoichiometric air-fuel ratio, cause the air-fuel ratio control unit to operate the internal combustion engine at the stoichiometric air-fuel ratio or lower, and then execute stop control that is control for stopping supply of fuel to the internal combustion engine. An aspect of an embodiment of the invention may also be defined as follows. An exhaust gas control system for an internal combustion engine operable at a lean air-fuel ratio includes: an NOx selective catalytic reduction catalyst provided in an exhaust passage of the internal combustion engine, the NOx selective catalytic reduction catalyst being configured to adsorb ammonia and reduce NOx with the use of the adsorbed ammonia as a reducing agent; and an electronic control unit configured to i) change an air-fuel ratio in the internal combustion engine, ii) after a request to stop the internal combustion engine has been issued, until an air-fuel ratio in the NOx selective catalytic reduction catalyst becomes lower than or equal to a stoichiometric air-fuel ratio, operate the internal combustion engine at the stoichiometric air-fuel ratio or lower, and iii) after that, execute stop control that is control for stopping supply of fuel to the internal combustion engine.

Even when the air-fuel ratio in the SCR catalyst is a lean air-fuel ratio as a result of the fact that the internal combustion engine has been operated at a lean air-fuel ratio till then, it is possible to bring the air-fuel ratio in the SCR catalyst to the stoichiometric air-fuel ratio or lower by operating the internal combustion engine at the stoichiometric air-fuel ratio or lower before the internal combustion engine is stopped. Thus, it is possible to suppress self-consumption of ammonia. Therefore, it is possible to suppress a deficiency of ammonia adsorbed in the SCR catalyst at the start of the internal combustion engine.

The exhaust gas control system may further include an upstream catalyst provided in the exhaust passage at a portion upstream of the NOx selective catalytic reduction catalyst, the upstream catalyst being a catalyst of which exhaust gas purification performance decreases because of hydrocarbon poisoning, and the engine stop control unit may be configured to, in the stop control, after causing the air-fuel ratio control unit to operate the internal combustion engine at the stoichiometric air-fuel ratio or lower until the air-fuel ratio in the NOx selective catalytic reduction catalyst becomes the stoichiometric air-fuel ratio or lower, cause the air-fuel ratio control unit to operate the internal combustion engine at the stoichiometric air-fuel ratio or higher until an air-fuel ratio in the upstream catalyst becomes higher than or equal to the stoichiometric air-fuel ratio while the air-fuel ratio in the NOx selective catalytic reduction catalyst remains at the stoichiometric air-fuel ratio or lower, and then stop supply of fuel to the internal combustion engine.

When the internal combustion engine is operated at the stoichiometric air-fuel ratio or lower before supply of fuel to the internal combustion engine is stopped, the air-fuel ratio in the upstream catalyst located upstream of the SCR catalyst is also lower than or equal to the stoichiometric air-fuel ratio. Therefore, there is a concern that hydrocarbon poisoning occurs in the upstream catalyst. For this reason, after the air-fuel ratio in the SCR catalyst becomes lower than or equal to the stoichiometric air-fuel ratio, the internal combustion engine is operated at the stoichiometric air-fuel ratio or higher such that the air-fuel ratio in the upstream catalyst changes from the air-fuel ratio lower than or equal to the stoichiometric air-fuel ratio to the air-fuel ratio higher than or equal to the stoichiometric air-fuel ratio. Thus, it is possible to stop the internal combustion engine in a state where the air-fuel ratio in the upstream catalyst is higher than or equal to the stoichiometric air-fuel ratio. When the internal combustion engine is operated at a lean air-fuel ratio until the air-fuel ratio in the upstream catalyst becomes a lean air-fuel ratio, the internal combustion engine is stopped before the air-fuel ratio in the SCR catalyst becomes a lean air-fuel ratio. On the other hand, when the internal combustion engine is operated at the stoichiometric air-fuel ratio until the air-fuel ratio in the SCR catalyst becomes the stoichiometric air-fuel ratio, the air-fuel ratio in the upstream catalyst is also the stoichiometric air-fuel ratio. Therefore, in this case, the internal combustion engine may be immediately stopped when the air-fuel ratio in the SCR catalyst becomes the stoichiometric air-fuel ratio. In this way, it is possible to suppress the start of the internal combustion engine in a state where hydrocarbon poisoning is occurring in the upstream catalyst.

The exhaust gas control system may further include an upstream catalyst provided in the exhaust passage at a portion upstream of the NOx selective catalytic reduction catalyst, the upstream catalyst being a catalyst of which exhaust gas purification performance decreases because of hydrocarbon poisoning, and the engine stop control unit may be configured to, in the stop control, after supply of fuel to the internal combustion engine is stopped, adjust a pumping loss of the internal combustion engine such that a total intake air amount of the internal combustion engine in a period from when a rotation speed of the internal combustion engine becomes zero becomes a predetermined air amount, the predetermined air amount being a total intake air amount that is required to bring an air-fuel ratio in the upstream catalyst to the stoichiometric air-fuel ratio or higher while the air-fuel ratio in the NOx selective catalytic reduction catalyst remains lower than or equal to the stoichiometric air-fuel ratio.

After the air-fuel ratio in the SCR catalyst becomes lower than or equal to the stoichiometric air-fuel ratio, when the internal combustion engine is operated at the stoichiometric air-fuel ratio or higher such that the air-fuel ratio in the upstream catalyst is brought to the stoichiometric air-fuel ratio or higher, fuel is consumed. On the other hand, when supply of fuel is stopped after the air-fuel ratio in the SCR catalyst becomes lower than or equal to the stoichiometric air-fuel ratio, it is possible to reduce the consumption of fuel. After supply of fuel is stopped, the engine rotation speed decreases while air is emitted from the internal combustion engine. The degree of decrease in the engine rotation speed correlates with a pumping loss. Therefore, by adjusting the pumping loss, it is possible to adjust the amount of air that is emitted from the internal combustion engine by the time the engine rotation speed becomes zero. When the pumping loss is adjusted such that air that is emitted from the internal combustion engine passes through the upstream catalyst and does not reach the SCR catalyst, it is possible to suppress hydrocarbon poisoning of the upstream catalyst and self-consumption of ammonia in the SCR catalyst.

The engine stop control unit may be configured to set the pumping loss such that the pumping loss at the time when the predetermined air amount is small is larger than the pumping loss at the time when the predetermined air amount is large.

As the predetermined air amount reduces, the amount of air that is emitted from the internal combustion engine may be smaller. Because the engine rotation speed decreases earlier as the pumping loss is increased, the amount of air that is emitted from the internal combustion engine by the time the engine rotation speed becomes zero reduces. Therefore, by increasing the pumping loss as the predetermined air amount reduces, it is possible to suppress an excess of air that is emitted from the internal combustion engine. On the other hand, when the predetermined air amount is large, it is possible to cause a large amount of air to be emitted from the internal combustion engine by the time the rotation speed of the internal combustion engine becomes zero by reducing the pumping loss, so it is possible to suppress a deficiency of air. In this way, by adjusting the pumping loss in response to the predetermined air amount, it is possible to suppress an excess or deficiency of air that is emitted from the internal combustion engine.

The engine stop control unit may be configured to set the pumping loss such that the pumping loss at the time when a temperature of the internal combustion engine is high is larger than the pumping loss at the time when the temperature of the internal combustion engine is low.

The engine rotation speed is more difficult to decrease when the temperature of the internal combustion engine is high than when the temperature of the internal combustion engine is low. Therefore, when the temperature of the internal combustion engine is high, there is a concern that the amount of air that is emitted from the internal combustion engine becomes excessive by the time the rotation speed of the internal combustion engine becomes zero. In this case, it is possible to quickly decrease the rotation speed of the internal combustion engine by increasing the pumping loss, so it is possible to reduce the amount of air that is emitted from the internal combustion engine. Therefore, it is possible to suppress an excess of air. On the other hand, when the temperature of the internal combustion engine is low, the rotation speed of the internal combustion engine tends to decrease after supply of fuel is stopped, so there is a concern that the amount of air that is emitted from the internal combustion engine becomes deficient. In this case, it is possible to suppress a decrease in the rotation speed of the internal combustion engine by reducing the pumping loss, so it is possible to increase the amount of air that is emitted from the internal combustion engine. In this way, by adjusting the pumping loss in response to the temperature of the internal combustion engine, it is possible to suppress an excess or deficiency of air that is emitted from the internal combustion engine.

The upstream catalyst may include at least one of a three-way catalyst and an NOx storage reduction catalyst. The three-way catalyst may be provided in the exhaust passage of the internal combustion engine, and may have an oxygen storage capability. The NOx storage reduction catalyst may be provided in the exhaust passage at a portion downstream of the three-way catalyst. The NOx storage reduction catalyst may store NOx when the air-fuel ratio is a lean air-fuel ratio, and reduce NOx when the air-fuel ratio is lower than or equal to the stoichiometric air-fuel ratio.

Because ammonia is allowed to be produced in each of the three-way catalyst and the NSR catalyst, it is possible to supply ammonia to the SCR catalyst by providing the three-way catalyst and the NSR catalyst at a portion upstream of the SCR catalyst. By executing the stop control, the air-fuel ratio in each of the three-way catalyst and the NSR catalyst can also be lower than or equal to the stoichiometric air-fuel ratio. In this case, there is a concern that hydrocarbon poisoning occurs in the three-way catalyst and NSR catalyst. In contrast, when the air-fuel ratio in each of the three-way catalyst and the NSR catalyst is made higher than or equal to the stoichiometric air-fuel ratio at the time of a stop of the internal combustion engine, it is possible to eliminate hydrocarbon poisoning. Therefore, it is possible to suppress a decrease in the purification performance of each of the three-way catalyst and the NSR catalyst at the next start of the internal combustion engine.

The engine stop control unit may be configured to, when a request to stop the internal combustion engine has been issued and when a condition for self-consumption of ammonia adsorbed in the NOx selective catalytic reduction catalyst is satisfied, execute the stop control.

Self-consumption is a phenomenon that the amount of ammonia adsorbed in the SCR catalyst reduces as a result of the fact that ammonia adsorbed in the SCR catalyst is oxidized by oxygen in exhaust gas to produce NOx as described above and the NOx is reduced by other ammonia adsorbed in the SCR catalyst. When the condition for self-consumption of ammonia adsorbed in the SCR catalyst is not satisfied, self-consumption of ammonia does not occur even when the internal combustion engine is stopped, so it is not necessary to operate the internal combustion engine at the stoichiometric air-fuel ratio or lower before supply of fuel to the internal combustion engine is stopped. In this case, by immediately stopping the internal combustion engine without executing the stop control, it is possible to reduce the consumption of fuel.

The exhaust gas control system may further include an air-fuel ratio detection unit configured to detect or estimate the air-fuel ratio in the NOx selective catalytic reduction catalyst, and the engine stop control unit may be configured to, when the air-fuel ratio detected or estimated by the air-fuel ratio detection unit is a lean air-fuel ratio, determine that the condition for self-consumption of ammonia adsorbed in the NOx selective catalytic reduction catalyst is satisfied.

When the internal combustion engine has been operated at a lean air-fuel ratio, the air-fuel ratio in the SCR catalyst becomes a lean air-fuel ratio, so self-consumption of ammonia occurs in the SCR catalyst. In such a state, the air-fuel ratio that is detected or estimated by the air-fuel ratio detection unit is a lean air-fuel ratio. Therefore, when the air-fuel ratio detected or estimated by the air-fuel ratio detection unit is a lean air-fuel ratio, self-consumption can occur in the SCR catalyst. On the other hand, when the internal combustion engine has been operated at the stoichiometric air-fuel ratio or lower, the air-fuel ratio that is detected or estimated by the air-fuel ratio detection unit becomes lower than or equal to the stoichiometric air-fuel ratio, so self-consumption of ammonia does not occur in the SCR catalyst. In this case, it is possible to immediately stop the internal combustion engine without executing the stop control.

The exhaust gas control system may further include a temperature detection unit configured to detect or estimate a temperature in the NOx selective catalytic reduction catalyst, the engine stop control unit may be configured to, when the temperature detected or estimated by the temperature detection unit is higher than or equal to a lower limit temperature that is a temperature at which self-consumption of ammonia adsorbed in the NOx selective catalytic reduction catalyst begins, determine that the condition for self-consumption of ammonia adsorbed in the NOx selective catalytic reduction catalyst is satisfied.

Because self-consumption of ammonia does not occur in the SCR catalyst when the temperature of the SCR catalyst is lower than the lower limit temperature, it may be determined that the condition for self-consumption of ammonia adsorbed in the SCR catalyst is not satisfied. Therefore, it is possible to immediately stop the internal combustion engine even without executing the stop control. On the other hand, when the temperature of the SCR catalyst is higher than or equal to the lower limit temperature, self-consumption of ammonia can occur. Therefore, it may be determined that the condition for self-consumption of ammonia adsorbed in the SCR catalyst is satisfied.

The exhaust gas control system may further include a temperature detection unit configured to detect or estimate a temperature in the NOx selective catalytic reduction catalyst, and the engine stop control unit may be configured to, when the temperature detected or estimated by the temperature detection unit is lower than an upper limit temperature that is an upper limit value of a temperature at which ammonia remains in the NOx selective catalytic reduction catalyst, determine that the condition for self-consumption of ammonia adsorbed in the NOx selective catalytic reduction catalyst is satisfied.

When the temperature of the SCR catalyst is excessively high, the SCR catalyst is not able to adsorb ammonia any more, and ammonia desorbs from the SCR catalyst. Most of ammonia that has desorbed from the SCR catalyst flows out from the SCR catalyst. When the amount of ammonia that desorbs from the SCR catalyst per unit time becomes larger than the amount of ammonia that is adsorbed by the SCR catalyst per unit time, ammonia in the SCR catalyst reduces. That is, even when ammonia is supplied to the SCR catalyst, the amount of ammonia adsorbed in the SCR catalyst reduces. At the time of a stop of the internal combustion engine, when the temperature of ammonia is higher than the upper limit temperature, because almost no ammonia is adsorbed in the SCR catalyst, almost no ammonia that is subjected to self-consumption is left. Therefore, when the temperature of the SCR catalyst is higher than the upper limit temperature, because no ammonia remains in the SCR catalyst, self-consumption of ammonia does not occur. Therefore, it may be determined that the condition for self-consumption of ammonia adsorbed in the SCR catalyst is not satisfied. In the case of such a temperature, it is not necessary to execute the stop control, so it is possible to immediately stop the internal combustion engine. On the other hand, when the temperature of the SCR catalyst is lower than or equal to the upper limit temperature, ammonia can remain in the SCR catalyst, so self-consumption of ammonia can occur. Therefore, it is possible to determine that the condition for self-consumption of ammonia adsorbed in the SCR catalyst is satisfied.

According to an aspect of the present invention, it is possible to suppress a deficiency of ammonia adsorbed in the SCR catalyst at the time of the start of the internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a mode for carrying out an embodiment of the present invention will be exemplarily described in detail with reference to the accompanying drawings by way of embodiments. However, the scope of the invention is not intended to be limited to the dimensions, materials, shapes, relative arrangement, and the like, of components described in the embodiments unless otherwise specified.

First Embodiment

Figure 1:
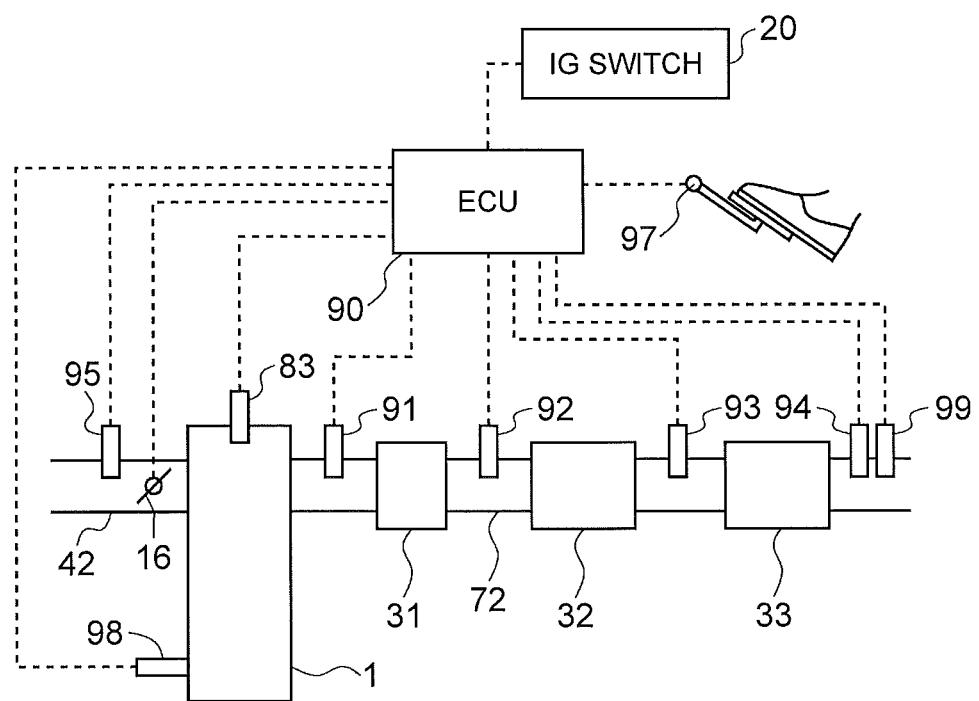
FIG. 1 is a view that shows the schematic configuration of an internal combustion engine according to first to third embodiments and the schematic configurations of an intake system and exhaust system of the internal combustion engine.

FIG. 1 is a view that shows the schematic configuration of an internal combustion engine according to the present embodiment and the schematic configurations of an intake system and exhaust system of the internal combustion engine. The internal combustion engine 1 shown in FIG. 1 is a gasoline engine. The internal combustion engine 1 is, for example, mounted on a vehicle.

An exhaust pipe 72 is connected to the internal combustion engine 1. A three-way catalyst 31, an NOx storage reduction catalyst 32 (hereinafter, referred to as NSR catalyst 32), and an NOx selective catalytic reduction catalyst 33 (hereinafter, referred to as SCR catalyst 33) are provided in the exhaust pipe 72 in order from the upstream side.

The three-way catalyst 31 purifies NOx, HC and CO when the atmosphere in the catalyst has a stoichiometric air-fuel ratio or an air-fuel ratio close to the stoichiometric air-fuel ratio. The three-way catalyst 31 has an oxygen storage capability. That is, excess oxygen is stored when the air-fuel ratio of exhaust gas flowing into the three-way catalyst 31 is a lean air-fuel ratio, and deficient oxygen is released when the air-fuel ratio of exhaust gas flowing into the three-way catalyst 31 is a rich air-fuel ratio. Thus, exhaust gas is purified. With the above oxygen storage capability, the three-way catalyst 31 is able to purify HC, CO and NOx even when the air-fuel ratio in the three-way catalyst 31 is an air-fuel ratio other than the stoichiometric air-fuel ratio. Instead of the three-way catalyst 31, another catalyst (for example, oxidation catalyst) having an oxidation capability may be provided.

The NSR catalyst 32 stores NOx contained in exhaust gas when the concentration of oxygen in exhaust gas flowing into the NSR catalyst 32 is high, and reduces the stored NOx when the concentration of oxygen in exhaust gas flowing into the NSR catalyst 32 decreases and there is a reducing agent. That is, the NSR catalyst 32 stores NOx when the air-fuel ratio in the NSR catalyst 32 is a lean air-fuel ratio, and reduces NOx when the air-fuel ratio in the NSR catalyst 32 is lower than or equal to the stoichiometric air-fuel ratio. HC or CO that is unburned fuel emitted from the internal combustion engine 1 may be utilized as a reducing agent that is supplied to the NSR catalyst 32.

When exhaust gas passes through the three-way catalyst 31 or the NSR catalyst 32, NOx in exhaust gas may react with HC or $H_2$ to produce ammonia ($NH_3$). For example, when $H_2$ is produced from CO or $H_2O$ in exhaust gas as a result of water gas shift reaction or steam-reforming reaction, the $H_2$ reacts with NOx in the three-way catalyst 31 or the NSR catalyst 32 to produce ammonia. Ammonia is produced when the air-fuel ratio of exhaust gas that passes through the three-way catalyst 31 or the NSR catalyst 32 is lower than or equal to the stoichiometric air-fuel ratio. In the embodiment, the three-way catalyst 31 and the NSR catalyst 32 correspond to an upstream catalyst according to an embodiment of the present invention.

The SCR catalyst 33 adsorbs a reducing agent in advance, and, when NOx passes through the SCR catalyst 33, selectively reduces NOx with the use of the adsorbed reducing agent. Ammonia that is produced in the three-way catalyst 31 or the NSR catalyst 32 may be utilized as a reducing agent that is supplied to the SCR catalyst 33.

A first air-fuel ratio sensor 91 is attached to the exhaust pipe 72 at a portion upstream of the three-way catalyst 31.

The first air-fuel ratio sensor 91 detects the air-fuel ratio of exhaust gas. A second air-fuel ratio sensor 92 is attached to the exhaust pipe 72 at a portion downstream of the three-way catalyst 31 and upstream of the NSR catalyst 32. The second air-fuel ratio sensor 92 detects the air-fuel ratio of exhaust gas.

A third air-fuel ratio sensor 93 is attached to the exhaust pipe 72 at a portion downstream of the NSR catalyst 32 and upstream of the SCR catalyst 33. The third air-fuel ratio sensor 93 detects the air-fuel ratio of exhaust gas. A fourth air-fuel ratio sensor 94 and an exhaust gas temperature sensor 99 are attached to the exhaust pipe 72 at a portion downstream of the SCR catalyst 33. The fourth air-fuel ratio sensor 94 detects the air-fuel ratio of exhaust gas. The exhaust gas temperature sensor 99 detects the temperature of exhaust gas. The temperature of the SCR catalyst 33 is allowed to be obtained from a detected value of the exhaust gas temperature sensor 99.

An injection valve 83 is attached to the internal combustion engine 1. The injection valve 83 supplies fuel to the internal combustion engine 1. On the other hand, an intake pipe 42 is connected to the internal combustion engine 1. A throttle 16 is provided in the intake pipe 42. The throttle 16 adjusts the intake air amount of the internal combustion engine 1. An air flow meter 95 is attached to the intake pipe 42 at a portion upstream of the throttle 16. The air flow meter 95 detects the intake air amount of the internal combustion engine 1.

An ECU 90 is provided in association with the internal combustion engine 1 configured as described above. The ECU 90 is an electronic control unit for controlling the internal combustion engine 1. The ECU 90 controls the internal combustion engine 1 in response to an operating condition of the internal combustion engine 1 or a driver's request. Other than the above-described sensors, an accelerator operation amount sensor 97 and a crank position sensor 98 are connected to the ECU 90 via electrical lines, and output signals of these various sensors are input to the ECU 90. The accelerator operation amount sensor 97 detects an engine load by outputting an electrical signal corresponding to an amount by which the driver depresses an accelerator pedal. The crank position sensor 98 detects an engine rotation speed. On the other hand, the injection valve 83 and the throttle 16 are connected to the ECU 90 via electrical lines, and the open/close timing of the injection valve 83 and the opening degree of the throttle 16 are controlled by the ECU 90. An IG switch 20 is connected to the ECU 90. When the driver operates the IG switch 20, the ECU 90 starts or stops the internal combustion engine 1.

The ECU 90 sets a target air-fuel ratio on the basis of the operating state (for example, the engine rotation speed and the accelerator operation amount) of the internal combustion engine 1. The throttle 16 or the injection valve 83 is controlled such that an actual air-fuel ratio becomes the target air-fuel ratio. Lean-burn operation (that is, an operation at a lean air-fuel ratio) is performed in the internal combustion engine 1 according to the present embodiment. However, the internal combustion engine 1 may be operated at an air-fuel ratio lower than or equal to the stoichiometric air-fuel ratio, for example, when the internal combustion engine 1 is cold started, when the engine operates at a high load, or when sulfur poisoning of the NSR catalyst 32 is eliminated. In the embodiment, the ECU 90 that controls the air-fuel ratio corresponds to an air-fuel ratio control unit in an embodiment of the present invention.

Ammonia adsorbed in the SCR catalyst 33 disappears through self-consumption of ammonia in the SCR catalyst 33. The self-consumption of ammonia is a phenomenon that ammonia adsorbed in the SCR catalyst 33 reacts with ambient oxygen to change into NOx and, in addition, ammonia is consumed in order for the NOx to react with ammonia adsorbed in the SCR catalyst 33.

For the purpose of suppressing self-consumption of ammonia, when a request to stop the internal combustion engine 1 has been issued, the ECU 90 sets the air-fuel ratio in the SCR catalyst 33 to a rich air-fuel ratio and then stops the internal combustion engine 1. In the present embodiment, when a driver attempts to stop the internal combustion engine 1 by operating the IG switch 20, it is regarded that there is a request to stop the internal combustion engine 1 (a request to stop the internal combustion engine 1 has been issued). Other than the above, for example, when the drive mode of a hybrid vehicle changes from a mode in which the hybrid vehicle travels by using the internal combustion engine 1 to a mode in which the hybrid vehicle travels by using a motor or when an idle stop is performed, it may be regarded that a request to stop the internal combustion engine 1 has been issued.

Therefore, when a request to stop the internal combustion engine 1 has been issued, before the ECU 90 stops supplying fuel to the internal combustion engine 1, the ECU 90 causes the internal combustion engine 1 to operate at a rich air-fuel ratio. When the SCR catalyst 33 is filled with exhaust gas at the time when the internal combustion engine 1 is operated at a rich air-fuel ratio, that is, when the air-fuel ratio in the SCR catalyst 33 is a rich air-fuel ratio, the ECU 90 stops supplying fuel to the internal combustion engine 1. Control for, after a request to stop the internal combustion engine 1 has been issued, operating the internal combustion engine 1 at a rich air-fuel ratio until the air-fuel ratio in the SCR catalyst 33 becomes a rich air-fuel ratio and then stopping supply of fuel to the internal combustion engine 1 is termed stop control. There are some conceivable methods of determining that the air-fuel ratio in the SCR catalyst 33 is a rich air-fuel ratio. In the present embodiment, when the air-fuel ratio of exhaust gas, which is detected by the fourth air-fuel ratio sensor 94, is a rich air-fuel ratio, it is determined that the air-fuel ratio in the SCR catalyst 33 is a rich air-fuel ratio. Other than the above, for example, it may be determined that the air-fuel ratio in the SCR catalyst 33 is a rich air-fuel ratio as a result of the fact that the internal combustion engine 1 is operated at a rich air-fuel ratio for a predetermined time. The predetermined time may be obtained by an experiment, simulation, or the like, in advance as a time that is taken until the air-fuel ratio in the SCR catalyst 33 becomes a rich air-fuel ratio. With the use of a known technique, the air-fuel ratio in the SCR catalyst 33 may be estimated on the basis of the operating state of the internal combustion engine 1. In the embodiment, the fourth air-fuel ratio sensor 94 or the ECU 90 that estimates the air-fuel ratio in the SCR catalyst 33 corresponds to an air-fuel ratio detection unit in an embodiment of the present invention.

Figure 2:
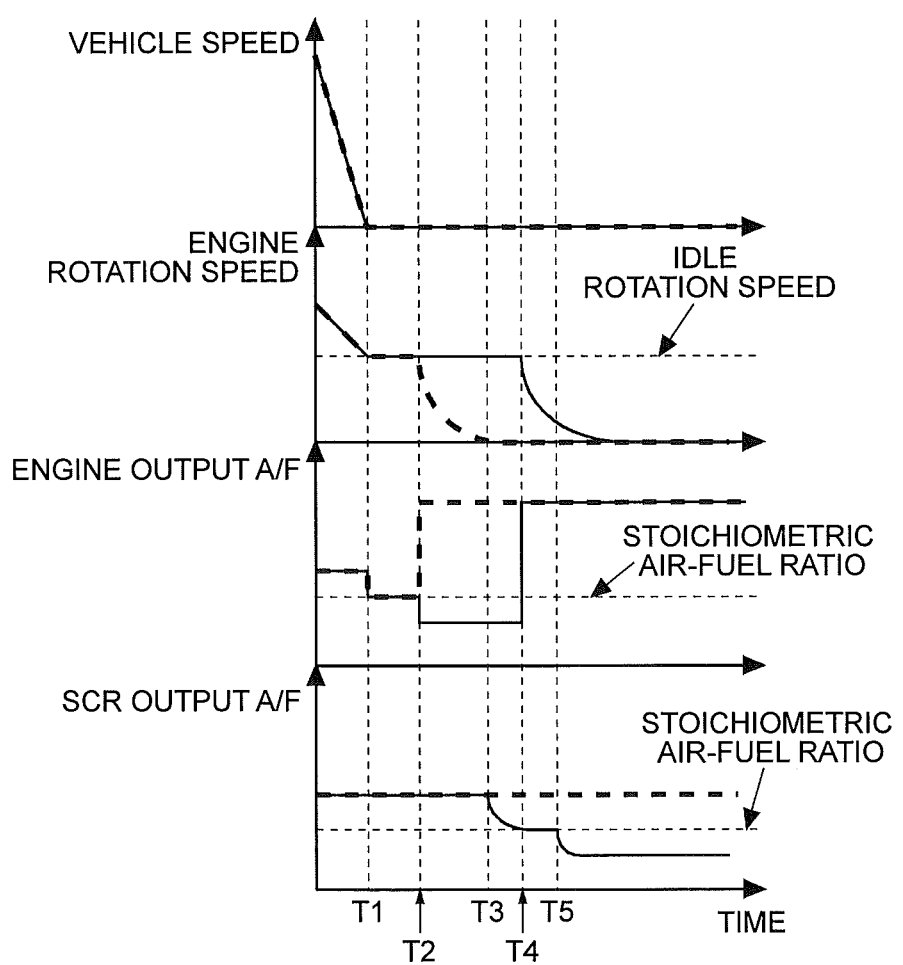
FIG. 2 is a time chart that shows changes in various numeric values at the time of a stop of the internal combustion engine.

FIG. 2 is a time chart that shows changes in various numeric values at the time of a stop of the internal combustion engine 1. The vehicle speed is the speed of the vehicle on which the internal combustion engine 1 is mounted. The engine output A/F is the air-fuel ratio of gas that is emitted from the internal combustion engine 1, and is the air-fuel ratio at the time of combustion in the internal combustion engine 1. The SCR output A/F is the air-fuel ratio of exhaust gas that flows out from the SCR catalyst 33, and is the air-fuel ratio of exhaust gas, which is detected by the fourth air-fuel ratio sensor 94. The continuous lines indicate the case where control according to the present embodiment is executed. The dashed lines indicate the case where existing control is executed for stopping the internal combustion engine 1 by stopping supply of fuel as soon as a request to stop the internal combustion engine 1 has been issued.

Initially, the case where the existing control is executed will be described. At T1, the vehicle speed becomes 0. Thus, the internal combustion engine 1 is operated at idle, so the engine rotation speed is an idle rotation speed from T1. During idle operation, the internal combustion engine 1 is operated at the stoichiometric air-fuel ratio, so the engine output A/F becomes the stoichiometric air-fuel ratio. At T2, the IG switch 20 is turned off. That is, a request to stop the internal combustion engine 1 is issued at T2. In the existing technique, in order to stop the internal combustion engine 1 as soon as a request to stop the internal combustion engine 1 has been issued, supply of fuel is stopped from T2. Therefore, the engine rotation speed begins to decrease from T2. Because supply of fuel is stopped from T2, the engine output A/F is higher than the stoichiometric air-fuel ratio from T2. In the existing case, because the internal combustion engine 1 is immediately stopped, exhaust gas at the time when the internal combustion engine 1 is operating at the idle rotation speed does not reach the SCR catalyst 33, so the SCR output A/F remains at a lean air-fuel ratio and does not change.

Next, the case where control according to the present embodiment is executed will be described. The control is the same as the existing control until T2. When a request to stop the internal combustion engine 1 is issued at T2, the internal combustion engine 1 is operated at a rich air-fuel ratio from T2. That is, stop control is started from T2. The engine output A/F is a rich air-fuel ratio from T2; however, it takes time for exhaust gas having a rich air-fuel ratio to reach the SCR catalyst 33. Therefore, the SCR output A/F begins to decrease from T3, and the SCR output A/F becomes the stoichiometric air-fuel ratio at T4. Here, because the SCR catalyst 33 also has a certain oxygen storage capability, when exhaust gas having a rich air-fuel ratio flows into the SCR catalyst 33, oxygen is released from the SCR catalyst 33. While oxygen is being released, the air-fuel ratio in the SCR catalyst 33 is the stoichiometric air-fuel ratio. In the present embodiment, when the SCR output A/F becomes lower than or equal to the stoichiometric air-fuel ratio, supply of fuel is stopped in order to actually stop the internal combustion engine 1. That is, supply of fuel is stopped at T4, the engine rotation speed begins to decrease, and the engine output A/F becomes a lean air-fuel ratio. Unless otherwise specified, stopping the internal combustion engine 1 means stopping supply of fuel. In the present embodiment, stop control is executed in a period from T2 to T4. Because exhaust gas having a rich air-fuel ratio exists at a portion upstream of the SCR catalyst 33, exhaust gas having a rich air-fuel ratio is supplied to the SCR catalyst 33 until the rotation speed of the internal combustion engine 1 becomes zero even after T4. Oxygen that has been stored in the SCR catalyst 33 is empty at T5, and the SCR output A/F decreases from T5 to become a rich air-fuel ratio.

Figure 3:
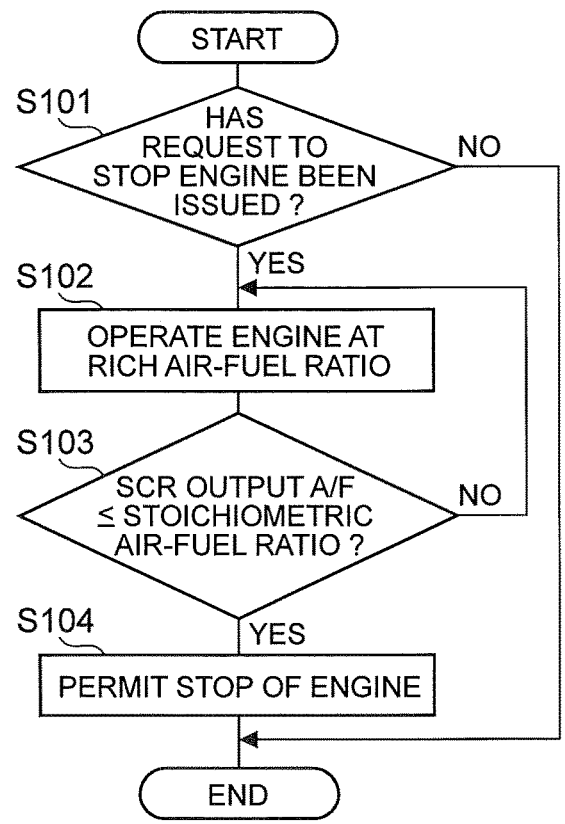
FIG. 3 is a flowchart of control at the time of a stop of the internal combustion engine according to the first embodiment.

FIG. 3 is a flowchart of control at the time of a stop of the internal combustion engine 1 according to the present embodiment. The flowchart is executed by the ECU 90 at predetermined time intervals during operation of the internal combustion engine 1. In the present embodiment, the ECU 90 that processes the flowchart corresponds to an engine stop control unit in an embodiment of the present invention.

In step S101, it is determined whether a request to stop the internal combustion engine 1 has been issued. That is, it is determined whether it is the time T2 in FIG. 2. For example, when the IG switch 20 is in an off state, it is determined that a request to stop the internal combustion engine 1 has been issued. When affirmative determination is made in step S101, the process proceeds to step S102. On the other hand, when negative determination is made in step S101, the flowchart is ended.

In step S102, the internal combustion engine 1 is operated at a rich air-fuel ratio. That is, the target air-fuel ratio of the internal combustion engine 1 is set to a rich air-fuel ratio. The target air-fuel ratio at this time may be obtained in advance by an experiment, simulation, or the like. Thus, as shown from T2 to T3 in FIG. 2, the engine output A/F is set to a rich air-fuel ratio. Thus, the air-fuel ratio of exhaust gas that flows through the exhaust pipe 72 sequentially becomes a rich air-fuel ratio from the internal combustion engine 1 side.

In step S103, it is determined whether the SCR output A/F is lower than or equal to the stoichiometric air-fuel ratio. That is, it is determined whether the air-fuel ratio in the SCR catalyst 33 is lower than or equal to the stoichiometric air-fuel ratio. This may be regarded as determining whether the time T3 in FIG. 2 has been reached. In this step, it is determined whether the operation at a rich air-fuel ratio is allowed to be terminated. It may be determined that the SCR output A/F is lower than or equal to the stoichiometric air-fuel ratio when the air-fuel ratio detected by the fourth air-fuel ratio sensor 94 is lower than or equal to the stoichiometric air-fuel ratio. Alternatively, it may be determined that the SCR output A/F is lower than or equal to the stoichiometric air-fuel ratio when the internal combustion engine 1 is operated at a rich air-fuel ratio for a predetermined time. In addition, it is also possible to estimate the SCR output A/F, so it may be determined on the basis of the estimated value that the SCR output A/F is lower than or equal to the stoichiometric air-fuel ratio. When affirmative determination is made in step S103, the time T4 in FIG. 2 has been reached, so the process proceeds to step S104. On the other hand, when negative determination is made in step S103, the process returns to step S102. That is, until the SCR output A/F becomes lower than or equal to the stoichiometric air-fuel ratio, the operation at a rich air-fuel ratio is continued.

In step S104, stopping the internal combustion engine 1 is permitted. Thus, supply of fuel to the internal combustion engine 1 is stopped. After that, the internal combustion engine 1 coasts; however, the rotation speed gradually decreases and finally becomes zero.

In the flowchart shown in FIG. 3, the internal combustion engine 1 is operated at a rich air-fuel ratio in step S102 in order to promptly decrease the air-fuel ratio in the SCR catalyst 33. Instead, the internal combustion engine 1 may be operated at the stoichiometric air-fuel ratio. When the internal combustion engine 1 is operated at the stoichiometric air-fuel ratio, it takes time; however, it is also possible to bring the air-fuel ratio in the SCR catalyst 33 to the stoichiometric air-fuel ratio. When the air-fuel ratio in the SCR catalyst 33 is the stoichiometric air-fuel ratio, it is possible to suppress self-consumption of ammonia.

In the present embodiment, the three-way catalyst 31 and the NSR catalyst 32 are not necessarily required. For example, when an ammonia addition valve that supplies ammonia to the SCR catalyst 33 is provided instead of the three-way catalyst 31 and the NSR catalyst 32, the three-way catalyst 31 and the NSR catalyst 32 may be omitted.

In this way, because the air-fuel ratio in the SCR catalyst 33 after a stop of the internal combustion engine 1 is lower than or equal to the stoichiometric air-fuel ratio, it is possible to suppress self-consumption of ammonia in the SCR catalyst 33 after a stop of the internal combustion engine 1. Thus, it is possible to suppress a reduction in the amount of adsorbed ammonia after a stop of the internal combustion engine 1, so it is possible to suppress a decrease in the purification rate of NOx at the next start of the internal combustion engine 1.

Second Embodiment

In the present embodiment, a condition for executing stop control is set. The other devices, and the like, are the same as those of the first embodiment, so the description thereof is omitted. In the present embodiment, it is determined whether to execute stop control on the basis of the temperature of the SCR catalyst 33 or the air-fuel ratio in the SCR catalyst 33.

Ammonia adsorbed in the SCR catalyst 33 also disappears not only through self-consumption but also through desorption of ammonia from the SCR catalyst 33. Desorption of ammonia is a phenomenon that ammonia desorbs from an adsorption site when the temperature of the SCR catalyst 33 is relatively high.

Figure 4:
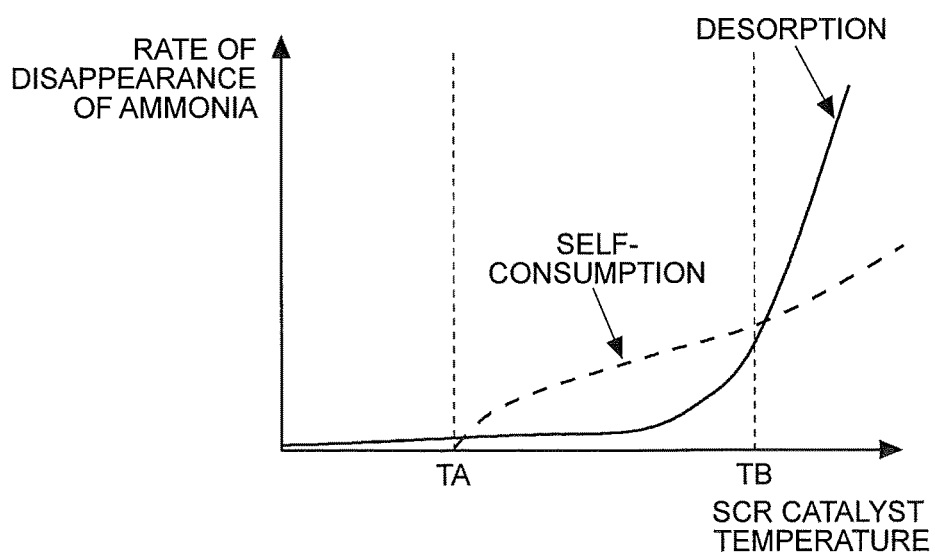
FIG. 4 is a graph that shows the relationship between a temperature of an SCR catalyst and a rate of disappearance of ammonia.

Even when the internal combustion engine 1 is stopped and there is no NOx that flows into the SCR catalyst 33, desorption of ammonia and self-consumption of ammonia can occur. FIG. 4 is a graph that shows the relationship between a temperature of the SCR catalyst 33 and a rate of disappearance of ammonia. The rate of disappearance of ammonia is the amount of ammonia that disappears from the SCR catalyst 33 per unit time. The continuous line in FIG. 4 indicates the rate of disappearance of ammonia through desorption of ammonia. The dashed line indicates the rate of disappearance of ammonia through self-consumption of ammonia.

TA is a temperature (hereinafter, also referred to as lower limit temperature) at which self-consumption of ammonia begins. TB is an upper limit value of a temperature (hereinafter, also referred to as upper limit temperature) at which ammonia remains in the SCR catalyst 33. When the temperature of the SCR catalyst 33 is higher than the upper limit temperature TB, the amount of ammonia that desorbs from the SCR catalyst 33 is larger than the amount of ammonia that is newly adsorbed in the SCR catalyst 33 even when ammonia is supplied, with the result that no ammonia remains in the SCR catalyst 33. As shown in FIG. 4, self-consumption of ammonia begins from the lower limit temperature TA, and the rate of disappearance of ammonia through self-consumption of ammonia increases as the temperature rises. However, when the temperature of the SCR catalyst 33 is higher than the upper limit temperature TB, the influence of desorption of ammonia is larger than the influence of self-consumption of ammonia. When the temperature of the SCR catalyst 33 is higher than the upper limit temperature TB, even when ammonia is supplied to the SCR catalyst 33, ammonia desorbs from the SCR catalyst 33, so it becomes difficult to increase the amount of adsorbed ammonia. When no ammonia is adsorbed in the SCR catalyst 33, self-consumption of ammonia does not occur. That is, when the temperature of the SCR catalyst 33 is higher than or equal to the lower limit temperature and lower than or equal to the upper limit temperature, self-consumption of ammonia can occur.

As described above, in the present embodiment, when a request to stop the internal combustion engine 1 has been issued, and when the temperature of the SCR catalyst 33 is higher than or equal to the lower limit temperature TA and lower than or equal to the upper limit temperature TB, stop control is executed. In the present embodiment, the case where stop control is executed when a request to stop the internal combustion engine 1 has been issued and when the temperature of the SCR catalyst 33 is higher than or equal to the lower limit temperature TA and lower than or equal to the upper limit temperature TB will be described.

When the temperature of the SCR catalyst 33 is lower than the lower limit temperature TA, self-consumption of ammonia almost does not occur in the SCR catalyst 33, so it is not necessary to execute stop control for suppressing self-consumption of ammonia. When the temperature of the SCR catalyst 33 is higher than the upper limit temperature TB, ammonia is almost not adsorbed in the SCR catalyst 33, so it is not necessary to execute stop control for suppressing self-consumption of ammonia. In this way, when it is not necessary to bring the air-fuel ratio in the SCR catalyst 33 to a rich air-fuel ratio, it is possible to reduce the consumption of fuel by quickly stopping the internal combustion engine 1 without executing stop control.

In the present embodiment, when a request to stop the internal combustion engine 1 has been issued, and only when the air-fuel ratio in the SCR catalyst 33 is a lean air-fuel ratio, stop control is executed. When the air-fuel ratio in the SCR catalyst 33 is not a lean air-fuel ratio, that is, the air-fuel ratio in the SCR catalyst 33 is the stoichiometric air-fuel ratio or a rich air-fuel ratio, because oxygen is almost not contained in exhaust gas, self-consumption of ammonia almost does not occur after a stop of the internal combustion engine 1. Therefore, it is not necessary to execute stop control. In this case as well, it is possible to reduce the consumption of fuel by quickly stopping the internal combustion engine 1.

Figure 5:
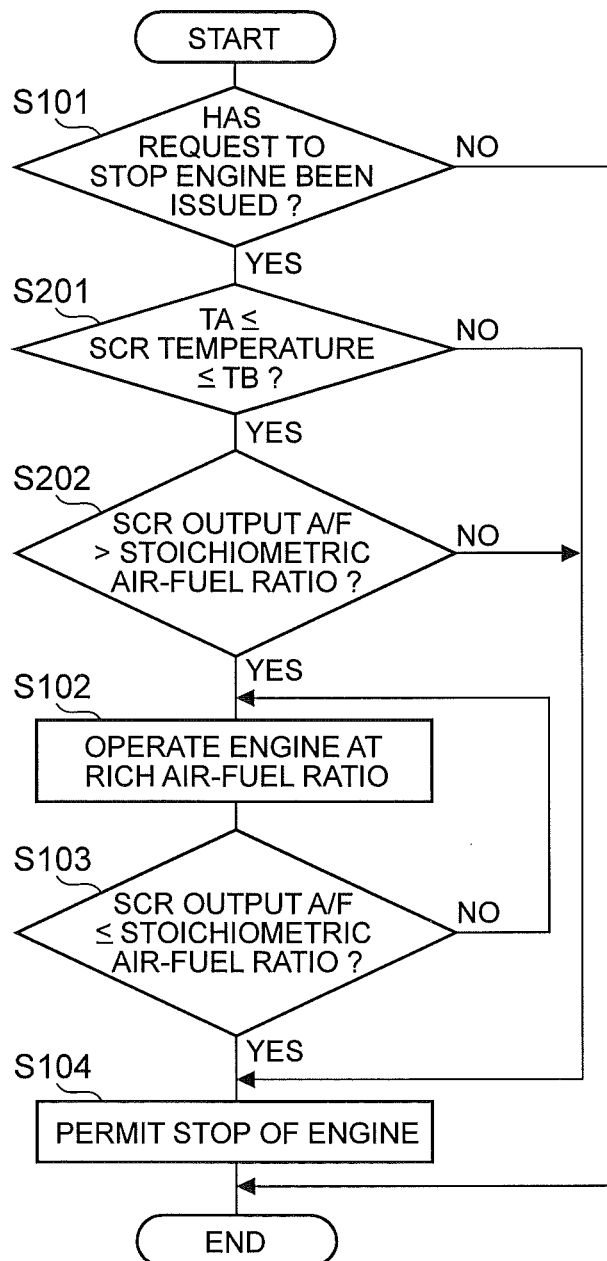
FIG. 5 is a flowchart of control at the time of a stop of the internal combustion engine according to the second embodiment.

FIG. 5 is a flowchart of control at the time of a stop of the internal combustion engine 1 according to the present embodiment. The flowchart is executed by the ECU 90 at predetermined time intervals during operation of the internal combustion engine 1. Like step numbers denote steps of the same processes as those of the steps of the above-described flowchart, and the description thereof is omitted. In the present embodiment, the ECU 90 that processes the flowchart corresponds to an engine stop control unit in the invention.

In the flowchart shown in FIG. 5, when affirmative determination is made in step S101, the process proceeds to step S201. In step S201, it is determined whether the temperature of the SCR catalyst 33 is higher than or equal to the lower limit temperature TA and lower than or equal to the upper limit temperature TB. In this step, it is determined whether the temperature of the SCR catalyst 33 falls within the range in which self-consumption of ammonia occurs. The lower limit temperature TA is, for example, 350° C., and the upper limit temperature TB is, for example, 500° C. However, these values depend on the composition, and the like, of the SCR catalyst 33, so these values are obtained in advance by an experiment, simulation, or the like. The temperature of the SCR catalyst 33 is obtained by the use of the exhaust gas temperature sensor 99. The temperature of the SCR catalyst 33 may also be estimated on the basis of the operating state of the internal combustion engine 1. In the present embodiment, the exhaust gas temperature sensor 99 or the ECU 90 that estimates the temperature of the SCR catalyst 33 corresponds to a temperature detection unit in embodiments of the present invention. When affirmative determination is made in step S201, the process proceeds to step S202. On the other hand, when negative determination is made in step S201, the process proceeds to step S104.

In step S202, it is determined whether the SCR output A/F is higher than the stoichiometric air-fuel ratio. That is, it is determined whether the air-fuel ratio in the SCR catalyst 33 is a lean air-fuel ratio. In this step, it is determined whether it is necessary to decrease the air-fuel ratio in the SCR catalyst 33 to an air-fuel ratio lower than or equal to the stoichiometric air-fuel ratio. When affirmative determination is made in step S202, the process proceeds to step S102. On the other hand, when negative determination is made in step S202, the process proceeds to step S104.

In this way, only when the air-fuel ratio in the SCR catalyst 33 is a lean air-fuel ratio at which self-consumption of ammonia occurs and the temperature of the SCR catalyst 33 is a temperature at which the amount of adsorbed ammonia reduces, stop control is executed. Thus, it is possible to suppress the operation of the internal combustion engine 1 more than necessary. Thus, it is possible to reduce the consumption of fuel.

In the present embodiment, stop control is executed when both the condition regarding the temperature of the SCR catalyst 33 and the condition regarding the air-fuel ratio in the SCR catalyst 33 are satisfied. Instead, when the internal combustion engine 1 is operated at a rich air-fuel ratio at the time when any one of the conditions is satisfied, it is also possible to reduce the consumption of fuel. That is, step S201 or step S202 may be omitted.

In the present embodiment, stop control is executed when the temperature of the SCR catalyst 33 is higher than or equal to the lower limit temperature TA and lower than or equal to the upper limit temperature TB. Instead, stop control may be executed when the temperature of the SCR catalyst 33 is higher than or equal to the lower limit temperature TA even when the temperature of the SCR catalyst 33 is not lower than or equal to the upper limit temperature TB. Alternatively, stop control may be executed when the temperature of the SCR catalyst 33 is lower than or equal to the upper limit temperature TB even when the temperature of the SCR catalyst 33 is not higher than or equal to the lower limit temperature TA.

Third Embodiment

In stop control according to the present embodiment, after the air-fuel ratio in the SCR catalyst 33 is brought to a rich air-fuel ratio before the internal combustion engine 1 is stopped, the internal combustion engine 1 is operated such that the air-fuel ratio in each of the three-way catalyst 31 and the NSR catalyst 32 is changed from a rich air-fuel ratio resulting from the previous process to an air-fuel ratio higher than or equal to the stoichiometric air-fuel ratio, and then supply of fuel to the internal combustion engine 1 is stopped. Thus, the internal combustion engine 1 is stopped. In the above-described embodiment, the three-way catalyst 31 and the NSR catalyst 32 are not indispensable components, but, in the present embodiment, at least one of the three-way catalyst 31 and the NSR catalyst 32 is an indispensable component. In the present embodiment, description will be made on the assumption that both the three-way catalyst 31 and the NSR catalyst 32 are provided.

When the internal combustion engine 1 is operated such that the air-fuel ratio in the SCR catalyst 33 becomes a rich air-fuel ratio as in the case of the first embodiment before the internal combustion engine 1 is stopped, the air-fuel ratio in each of the three-way catalyst 31 and the NSR catalyst 32 also becomes a rich air-fuel ratio. Then, in each of the three-way catalyst 31 and the NSR catalyst 32, poisoning due to HC (hydrocarbons) (hydrocarbon poisoning) can occur. There is a concern that the purification performance of each of the three-way catalyst 31 and the NSR catalyst 32 decreases at the next start of the internal combustion engine 1 because of the hydrocarbon poisoning.

On the other hand, in the present embodiment, before the internal combustion engine 1 is stopped, initially, the air-fuel ratio in the SCR catalyst 33 is brought to a rich air-fuel ratio, and then the air-fuel ratio in each of the three-way catalyst 31 and the NSR catalyst 32 is brought to an air-fuel ratio higher than or equal to the stoichiometric air-fuel ratio while the air-fuel ratio in the SCR catalyst 33 remains at a rich air-fuel ratio. Thus, it is possible to start the internal combustion engine 1 in a state where the purification performance of each of the three-way catalyst 31, the NSR catalyst 32 and the SCR catalyst 33 is high at the next start of the internal combustion engine 1. When the air-fuel ratio in each of the three-way catalyst 31 and the NSR catalyst 32 is excessively high, there is a concern that the purification performance decreases, so an optimal value of the air-fuel ratio may be obtained in advance through an experiment, simulation, or the like.

Figure 6:
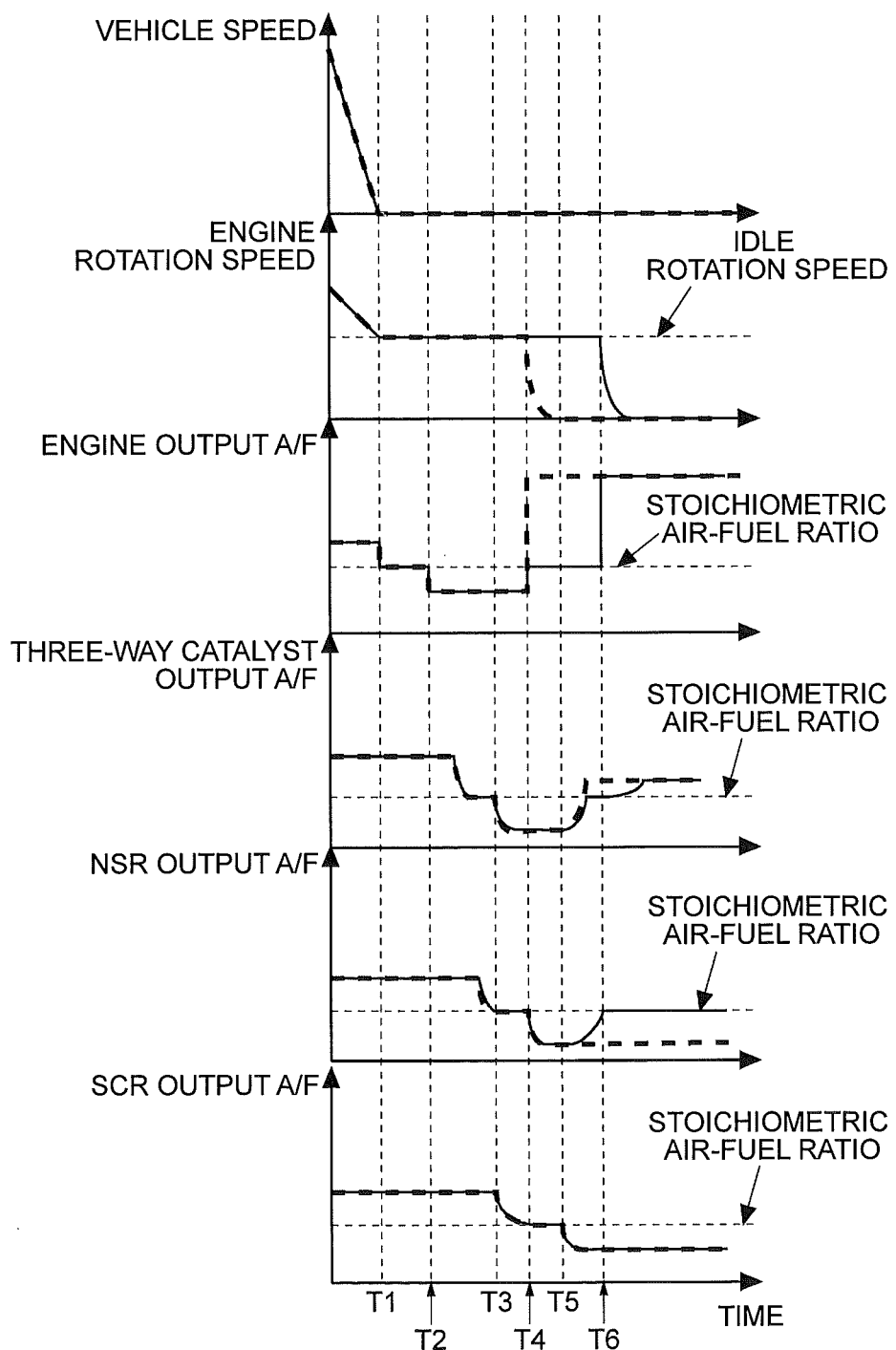
FIG. 6 is a time chart that shows changes in various numeric values at the time of a stop of the internal combustion engine.

FIG. 6 is a flowchart that shows changes in various numeric values at the time of a stop of the internal combustion engine 1. The continuous lines indicate the case where control according to the present embodiment is executed. The dashed lines indicate the case where control according to the first embodiment or the second embodiment is executed. The three-way catalyst output A/F is the air-fuel ratio of exhaust gas that flows out from the three-way catalyst 31, and is the air-fuel ratio of exhaust gas, which is detected by the second air-fuel ratio sensor 92. The NSR output A/F is the air-fuel ratio of exhaust gas that flows out from the NSR catalyst 32, and is the air-fuel ratio of exhaust gas, which is detected by the third air-fuel ratio sensor 93. Like signs T1 to T5 in FIG. 6 denote the same times as those in FIG. 2.

The continuous lines and the dashed lines take the same paths until T4. After the engine output A/F becomes a rich air-fuel ratio at T2, the air-fuel ratio in the upstreammost three-way catalyst 31 becomes a rich air-fuel ratio first, and then the air-fuel ratio in the NSR catalyst 32 and the air-fuel ratio in the SCR catalyst 33 become a rich air-fuel ratio in this order. Because the three-way catalyst 31 and the NSR catalyst 32 each have an oxygen storage capability, the three-way catalyst output A/F is the stoichiometric air-fuel ratio while oxygen is being released from the three-way catalyst 31 before the three-way catalyst output A/F becomes a rich air-fuel ratio, and the NSR output A/F is the stoichiometric air-fuel ratio while oxygen is being released from the NSR catalyst 32 before the NSR output A/F becomes a rich air-fuel ratio. In the present embodiment, different from the first embodiment or the second embodiment, the internal combustion engine 1 is operated at the stoichiometric air-fuel ratio from T4. Thus, the engine output A/F becomes the stoichiometric air-fuel ratio after T4. After that, the air-fuel ratio begins to rise in order of the three-way catalyst output A/F and the NSR output A/F. When the NSR output A/F becomes the stoichiometric air-fuel ratio at T6, supply of fuel to the internal combustion engine 1 is stopped. In this case, because exhaust gas having the stoichiometric air-fuel ratio does not reach the SCR catalyst 33, the air-fuel ratio in the SCR catalyst 33 is kept at a rich air-fuel ratio. When the distance between the NSR catalyst 32 and the SCR catalyst 33 is short, exhaust gas having the stoichiometric air-fuel ratio can reach the SCR catalyst 33 by the time the rotation speed of the internal combustion engine 1 becomes zero, so the air-fuel ratio in the SCR catalyst 33 may rise. However, because the air-fuel ratio of exhaust gas is the stoichiometric air-fuel ratio, self-consumption of ammonia in the SCR catalyst 33 is suppressed. In the present embodiment, stop control is executed in a period from T2 to T6.

Supply of fuel to the internal combustion engine 1 is stopped from T6; however, gas is emitted from the internal combustion engine 1 until the rotation speed of the internal combustion engine 1 becomes zero. That is, the engine output A/F is a lean air-fuel ratio from T6, and, when the exhaust gas reaches the three-way catalyst 31, the air-fuel ratio in the three-way catalyst 31 becomes a lean air-fuel ratio. Because the three-way catalyst 31 has an oxygen storage capability, the three-way catalyst output A/F can be the stoichiometric air-fuel ratio while the three-way catalyst 31 is storing oxygen just after T6.

Figure 7:
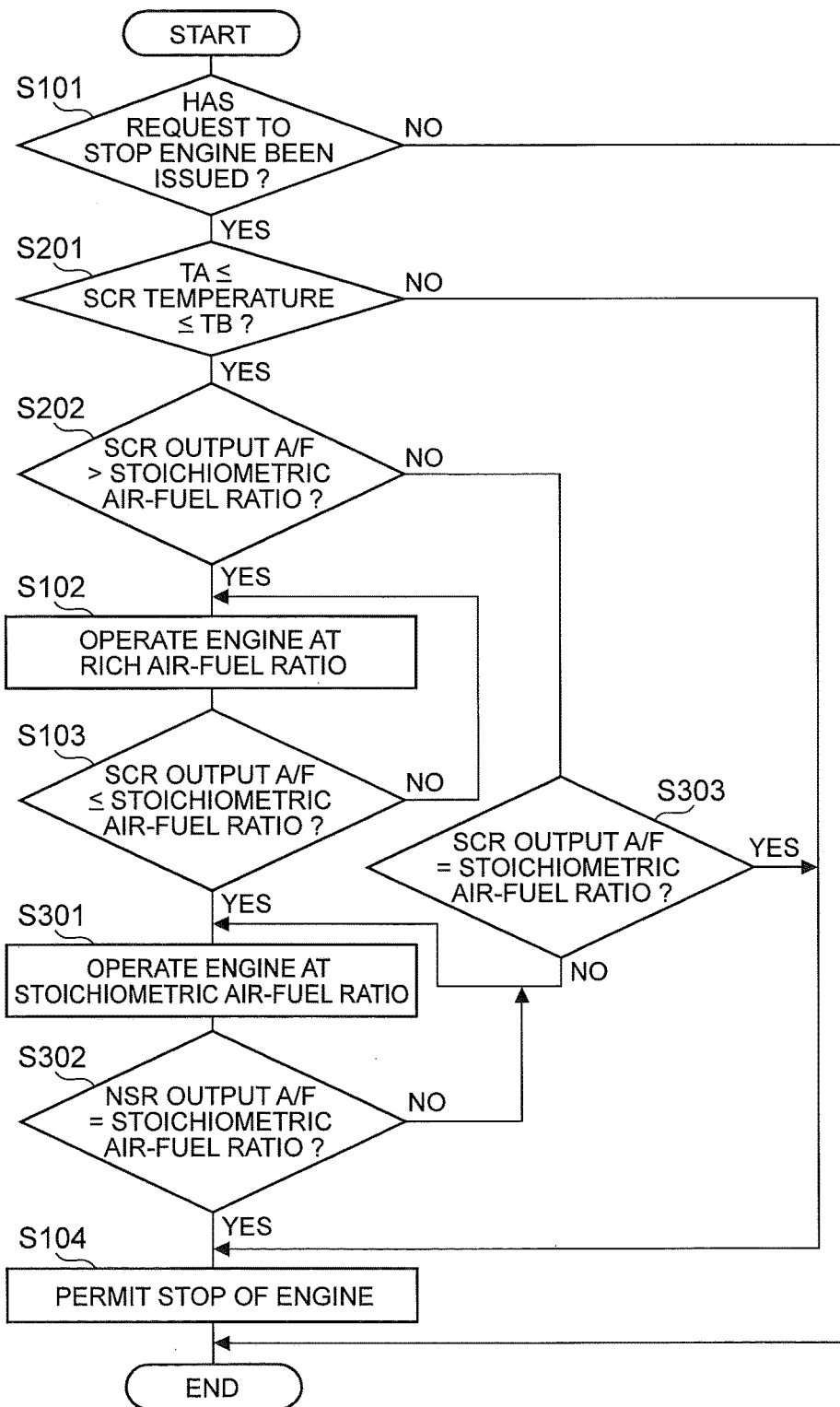
FIG. 7 is a flowchart of control at the time of a stop of the internal combustion engine according to the third embodiment.

FIG. 7 is a flowchart of control at the time of a stop of the internal combustion engine 1 according to the present embodiment. The flowchart is executed by the ECU 90 at predetermined time intervals during operation of the internal combustion engine 1. Like step numbers denote steps of the same processes as those of the steps of the above-described flowchart, and the description thereof is omitted. In the present embodiment, the ECU 90 that processes the flowchart corresponds to an engine stop control unit in the invention.

In the flowchart shown in FIG. 7, when affirmative determination is made in step S103, the process proceeds to step S301. In step S301, the internal combustion engine 1 is operated at the stoichiometric air-fuel ratio. Thus, the air-fuel ratio of exhaust gas that flows through the exhaust pipe 72 sequentially becomes the stoichiometric air-fuel ratio from the internal combustion engine 1 side.

In step S302, it is determined whether the NSR output A/F is the stoichiometric air-fuel ratio. That is, it is determined whether the air-fuel ratio in the NSR catalyst 32 is the stoichiometric air-fuel ratio. In this step, it is determined whether T6 in FIG. 6 has been reached. The NSR output A/F is the air-fuel ratio that is detected by the third air-fuel ratio sensor 93. In this step, it is determined whether the operation of the internal combustion engine 1 at the stoichiometric air-fuel ratio is allowed to be terminated. When affirmative determination is made in step S302, the process proceeds to step S104. On the other hand, when negative determination is made in step S302, the process returns to step S301. That is, until the NSR output A/F becomes the stoichiometric air-fuel ratio, the operation of the internal combustion engine 1 at the stoichiometric air-fuel ratio is continued.

In the flowchart shown in FIG. 7, when negative determination is made in step S202, the process proceeds to step S303. In step S303, it is determined whether the SCR output A/F is the stoichiometric air-fuel ratio. That is, in this step, it is determined whether the air-fuel ratio in the SCR catalyst 33 is not a rich air-fuel ratio. When the air-fuel ratio in the SCR catalyst 33 is a rich air-fuel ratio, it is presumable that the internal combustion engine 1 has been operated at a rich air-fuel ratio, so it is presumable that the air-fuel ratio in each of the three-way catalyst 31 and the NSR catalyst 32 that are located upstream of the SCR catalyst 33 is also a rich air-fuel ratio. When the air-fuel ratio in the SCR catalyst 33 is a rich air-fuel ratio, the operation of the internal combustion engine 1 at a rich air-fuel ratio is not required. However, because there is a concern that hydrocarbon poisoning is occurring in the three-way catalyst 31 and the NSR catalyst 32, when the SCR output A/F is a rich air-fuel ratio, the process proceeds to step S301, and the internal combustion engine 1 is operated at the stoichiometric air-fuel ratio.

On the other hand, when the air-fuel ratio in the SCR catalyst 33 is the stoichiometric air-fuel ratio, it is presumable that the internal combustion engine 1 has been operated at the stoichiometric air-fuel ratio, so it is presumable that the air-fuel ratio in each of the three-way catalyst 31 and the NSR catalyst 32 that are located upstream of the SCR catalyst 33 is also the stoichiometric air-fuel ratio. In this case, the internal combustion engine 1 is allowed to be stopped immediately without executing stop control, so the process proceeds to step S104.

As in the case of the first embodiment, at least one of step S201 and step S202 may be omitted. When step S202 is omitted, step S303 may also be omitted. In the present embodiment, both the three-way catalyst 31 and the NSR catalyst 32 are provided. Instead, even when any one of the three-way catalyst 31 and the NSR catalyst 32 is provided, control is similarly handled. For example, when the three-way catalyst 31 is provided and the NSR catalyst 32 is not provided, it just needs to be determined in step S302 whether the three-way catalyst output A/F is the stoichiometric air-fuel ratio. In the present embodiment, the internal combustion engine 1 is operated at the stoichiometric air-fuel ratio in step S301. Instead, the internal combustion engine 1 may be operated at a lean air-fuel ratio. When the internal combustion engine 1 is operated at a lean air-fuel ratio as well, it is possible to suppress hydrocarbon poisoning in the three-way catalyst 31 and the NSR catalyst 32. However, when oxygen is excessive in the three-way catalyst 31 and the NSR catalyst 32, the purification performance decreases, so a certain air-fuel ratio may be obtained by an experiment, simulation, or the like.

In step S302, it may be determined that the NSR output A/F becomes the stoichiometric air-fuel ratio as a result of, for example, the fact that the internal combustion engine 1 has been operated at the stoichiometric air-fuel ratio for a predetermined time without utilizing the air-fuel ratio of exhaust gas, which is detected by the third air-fuel ratio sensor 93. The predetermined time may be obtained in advance by an experiment, simulation, or the like, as a time from when the operation of the internal combustion engine 1 at the stoichiometric air-fuel ratio is started to when the air-fuel ratio in the NSR catalyst 32 becomes the stoichiometric air-fuel ratio.

As described above, according to the present embodiment, it is possible to suppress self-consumption of ammonia in the SCR catalyst 33 and to suppress hydrocarbon poisoning in the three-way catalyst 31 and the NSR catalyst 32, so it is possible to further raise the purification performance of exhaust gas at the next start of the internal combustion engine 1.

Fourth Embodiment

In stop control according to the third embodiment, after a request to stop the internal combustion engine 1 has been issued, the internal combustion engine 1 is operated at a rich air-fuel ratio, and then the internal combustion engine 1 is operated at the stoichiometric air-fuel ratio in order to eliminate hydrocarbon poisoning. On the other hand, in stop control according to the present embodiment, after a request to stop the internal combustion engine 1 has been issued, the internal combustion engine 1 is operated at a rich air-fuel ratio, after that, supply of fuel is stopped without the operation of the internal combustion engine 1 at the stoichiometric air-fuel ratio, and oxygen is supplied to the three-way catalyst 31 and the NSR catalyst 32 in just proportion by adjusting the degree of decrease in the rotation speed of the internal combustion engine 1 until the rotation speed of the internal combustion engine 1 becomes zero. Thus, hydrocarbon poisoning of each of the three-way catalyst 31 and the NSR catalyst 32 is eliminated.

Figure 8:
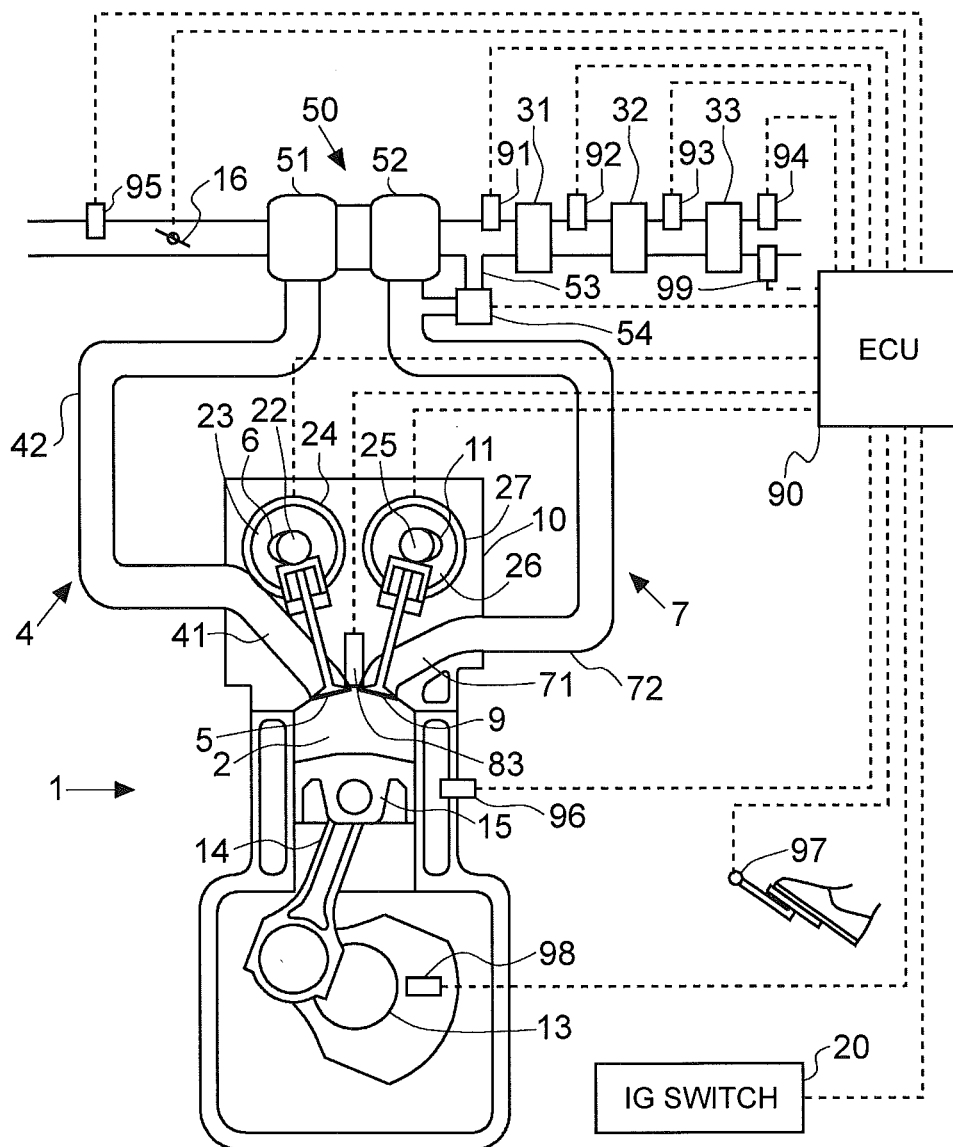
FIG. 8 is a view that shows the schematic configuration of an internal combustion engine according to a fourth embodiment and the schematic configurations of an intake system and exhaust system of the internal combustion engine.

FIG. 8 is a view that shows the schematic configuration of the internal combustion engine 1 according to the present embodiment and the schematic configurations of an intake system and exhaust system of the internal combustion engine 1. The difference from FIG. 1 will be mainly described. A cylinder head 10 of the internal combustion engine 1 has an intake port 41 and an exhaust port 71. The intake port 41 communicates the intake pipe 42 with a cylinder 2. The exhaust port 71 communicates the exhaust pipe 72 with the cylinder 2. An intake valve 5 is provided at the cylinder 2-side end of the intake port 41. The intake valve 5 is opened or closed by an intake cam 6. An exhaust valve 9 is provided at the cylinder 2-side end of the exhaust port 71. The exhaust valve 9 is opened or closed by an exhaust cam 11. The intake port 41 and the intake pipe 42 are included in an intake passage 4. The exhaust port 71 and the exhaust pipe 72 are included in an exhaust passage 7.

The intake cam 6 is connected to an intake cam shaft 22, and an intake pulley 24 is provided at an end of the intake cam shaft 22. A variable rotation phase mechanism (hereinafter referred to as intake VVT) 23 is provided between the intake cam shaft 22 and the intake pulley 24. The intake VVT 23 is able to change a relative rotation phase between the intake cam shaft 22 and the intake pulley 24.

The exhaust cam 11 is connected to an exhaust cam shaft 25, and an exhaust pulley 27 is provided at an end of the exhaust cam shaft 25. A variable rotation phase mechanism (hereinafter, referred to as exhaust VVT) 26 is provided between the exhaust cam shaft 25 and the exhaust pulley 27. The exhaust VVT 26 is able to change a relative rotation phase between the exhaust cam shaft 25 and the exhaust pulley 27.

The intake pulley 24 and the exhaust pulley 27 rotate by driving force obtained from a crankshaft 13. The intake VVT 23 is able to change the open/close timing of the intake valve 5 by changing the relationship between a rotation angle of the crankshaft 13 and a rotation angle of the intake cam shaft 22. The exhaust VVT 26 is able to change the open/close timing of the exhaust valve 9 by changing the relationship between a rotation angle of the crankshaft 13 and a rotation angle of the exhaust cam shaft 25. A mechanism of changing the open/close timing of the intake valve 5 or the exhaust valve 9 is not limited to the above-described intake VVT 23 or exhaust VVT 26. Another mechanism may be used.

A piston 15 coupled to the crankshaft 13 of the internal combustion engine 1 via a connecting rod 14 reciprocates inside the cylinder 2. A compressor 51 of a turbocharger 50 is provided in the intake pipe 42. The turbocharger 50 operates by using the energy of exhaust gas as a drive source. The throttle 16 is provided in the intake pipe 42 at a portion upstream of the compressor 51.

On the other hand, a turbine 52 of the turbocharger 50 is provided in the exhaust pipe 72. A bypass passage 53 is provided so as to connect the exhaust pipe 72 at a portion upstream of the turbine 52 with the exhaust pipe 72 at a portion downstream of the turbine 52. A wastegate valve 54 is provided in the bypass passage 53. The wastegate valve 54 opens or closes the bypass passage 53. The first air-fuel ratio sensor 91 is provided in the exhaust pipe 72 at a portion downstream of the bypass passage 53.

A coolant temperature sensor 96 is provided in the internal combustion engine 1. The coolant temperature sensor 96 detects the temperature of coolant of the internal combustion engine 1. It is possible to detect the temperature of the internal combustion engine 1 with the use of the coolant temperature sensor 96. A sensor that detects the temperature of lubricating oil instead of the temperature of coolant may be provided. The intake VVT 23, the exhaust VVT 26 and the wastegate valve 54 are connected to the ECU 90 via electrical lines. These devices are controlled by the ECU 90. The coolant temperature sensor 96 is connected to the ECU 90 via an electrical line. An output signal of the coolant temperature sensor 96 is input to the ECU 90.

The ECU 90 adjusts a pumping loss of the internal combustion engine 1 such that the amount of gas that is emitted from the internal combustion engine 1 in a period from when supply of fuel to the internal combustion engine 1 is stopped to when the engine rotation speed becomes zero becomes the amount of gas by which hydrocarbon poisoning in the NSR catalyst 32 is eliminated. The pumping loss is adjustable by at least one of the throttle 16, the intake VVT 23, the exhaust VVT 26 and the wastegate valve 54.

In the present embodiment, the pumping loss is adjusted such that an integrated amount (that is, a total amount) of gas that is emitted from the internal combustion engine 1 in a period from when supply of fuel to the internal combustion engine 1 is stopped to when the rotation speed of the internal combustion engine 1 becomes zero becomes the amount of gas, which corresponds to the volume of the exhaust passage 7 from an outlet of the cylinder 2 (that is, the boundary between the cylinder 2 and the exhaust port 71) to an inlet of the SCR catalyst 33. Because no fuel is supplied to the internal combustion engine 1, the integrated amount of gas that is emitted from the internal combustion engine 1 is equal to an integrated intake air amount of the internal combustion engine 1. In the present embodiment, the amount of gas, which corresponds to the volume of the exhaust passage 7 from the outlet of the cylinder 2 to the inlet of the SCR catalyst 33, corresponds to a predetermined air amount in embodiments of the present invention. The pumping loss at the time when the opening degree of the throttle 16 is small is larger than the pumping loss at the time when the opening degree of the throttle 16 is large. The pumping loss at the time when the opening degree of the wastegate valve 54 is small is larger than the pumping loss at the time when the opening degree of the wastegate valve 54 is large. For example, the pumping loss increases as the timing at which the opening degree of each of the intake valve 5 and the exhaust valve 9 becomes largest is more shifted from the timing at which the speed of the piston 15 is highest.

A time from when supply of fuel to the internal combustion engine 1 is stopped to when the rotation speed of the internal combustion engine 1 becomes zero is influenced by not only the pumping loss but also a friction loss. Because the friction loss increases as the temperature of the internal combustion engine 1 decreases, a time up to when the rotation speed of the internal combustion engine 1 becomes zero shortens. In the present embodiment, a coolant temperature is detected as the temperature of the internal combustion engine 1, and the pumping loss is adjusted in response to the coolant temperature. In the present embodiment, an example in which the pumping loss is adjusted on the basis of the predetermined air amount and the coolant temperature will be described. Instead, the pumping loss may be adjusted on the basis of only the predetermined air amount or the coolant temperature.

Figure 9:
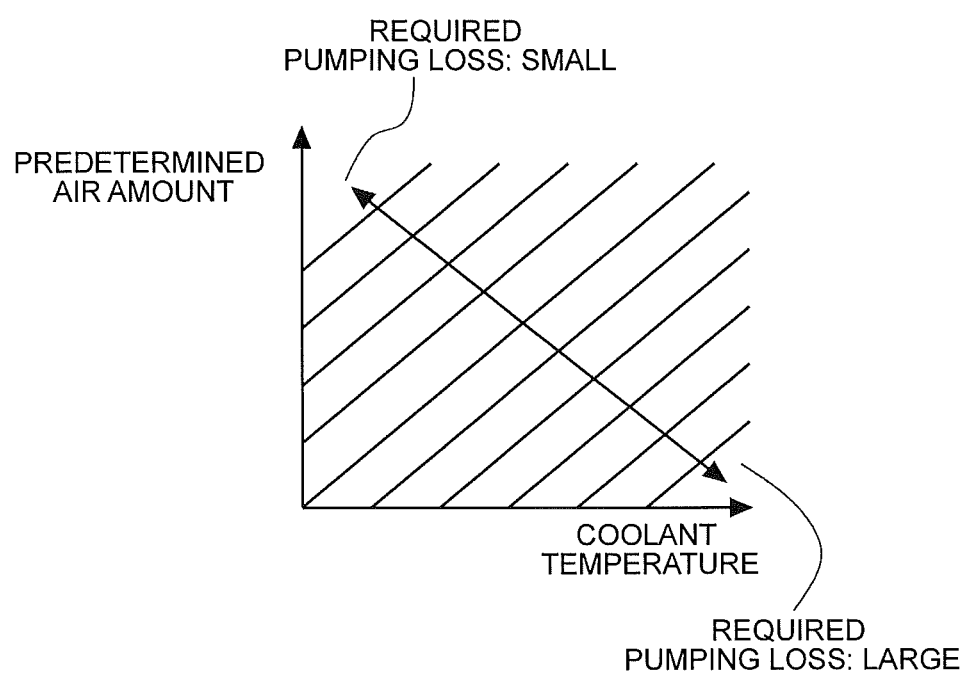
FIG. 9 is a graph that shows the relationship among a coolant temperature of the internal combustion engine, an integrated intake air amount (predetermined air amount) that is required from when supply of fuel to the internal combustion engine is stopped to when the rotation speed of the internal combustion engine becomes zero, and a required pumping loss.

FIG. 9 is a graph that shows the relationship among a coolant temperature of the internal combustion engine 1, an integrated intake air amount (predetermined air amount) that is required from when supply of fuel to the internal combustion engine 1 is stopped to when the rotation speed of the internal combustion engine 1 becomes zero, and a required pumping loss. The required pumping loss is such a pumping loss that an integrated amount of gas that is emitted from the internal combustion engine 1 in a period from when supply of fuel to the internal combustion engine 1 is stopped to when the rotation speed of the internal combustion engine 1 becomes zero is equal to the amount of gas, which corresponds to the volume of the exhaust passage 7 from the outlet of the cylinder 2 to the inlet of the SCR catalyst 33. The predetermined air amount is a value corresponding to the volume of the exhaust passage 7 from the outlet of the cylinder 2 to the inlet of the SCR catalyst 33. This value may be obtained in advance. The coolant temperature may be obtained with the use of the coolant temperature sensor 96. The amount of oxygen, which is required until the air-fuel ratio in the NSR catalyst 32 becomes the stoichiometric air-fuel ratio, varies depending on the oxygen storage capability of each of the three-way catalyst 31 and the NSR catalyst 32. Because the oxygen storage capability of each of the three-way catalyst 31 and the NSR catalyst 32 varies depending on degradation, or the like, the predetermined air amount may be changed in response to the oxygen storage capability of each of the three-way catalyst 31 and the NSR catalyst 32. However, in the present embodiment, for the purpose of providing simpler control, a change in the oxygen storage capability of each of the three-way catalyst 31 and the NSR catalyst 32 is not considered.

As shown in FIG. 9, as the predetermined air amount increases, the required pumping loss reduces. That is, as the predetermined air amount increases, it is required to operate the internal combustion engine 1 for a longer time, so the required pumping loss reduces. As the coolant temperature decreases, the required pumping loss reduces. That is, as the coolant temperature decreases, the friction loss increases, so the required pumping loss may be smaller.

The relationship shown in FIG. 9 may be obtained in advance by an experiment, simulation, or the like. The required pumping loss is obtained by the use of the relationship shown in FIG. 9, and an actual pumping loss is adjusted to the required pumping loss. The relationship among a required pumping loss, an opening degree of the throttle 16, an open/close timing of the intake valve 5, an open/close timing of the exhaust valve 9, and an opening degree of the wastegate valve 54 is obtained in advance by an experiment, simulation, or the like. A map for directly obtaining the opening degree of the throttle 16, the open/close timing of the intake valve 5, the open/close timing of the exhaust valve 9 and the opening degree of the wastegate valve 54 from a predetermined air amount and a coolant temperature without obtaining a required pumping loss may be prepared and stored in the ECU 90.

Figure 10:
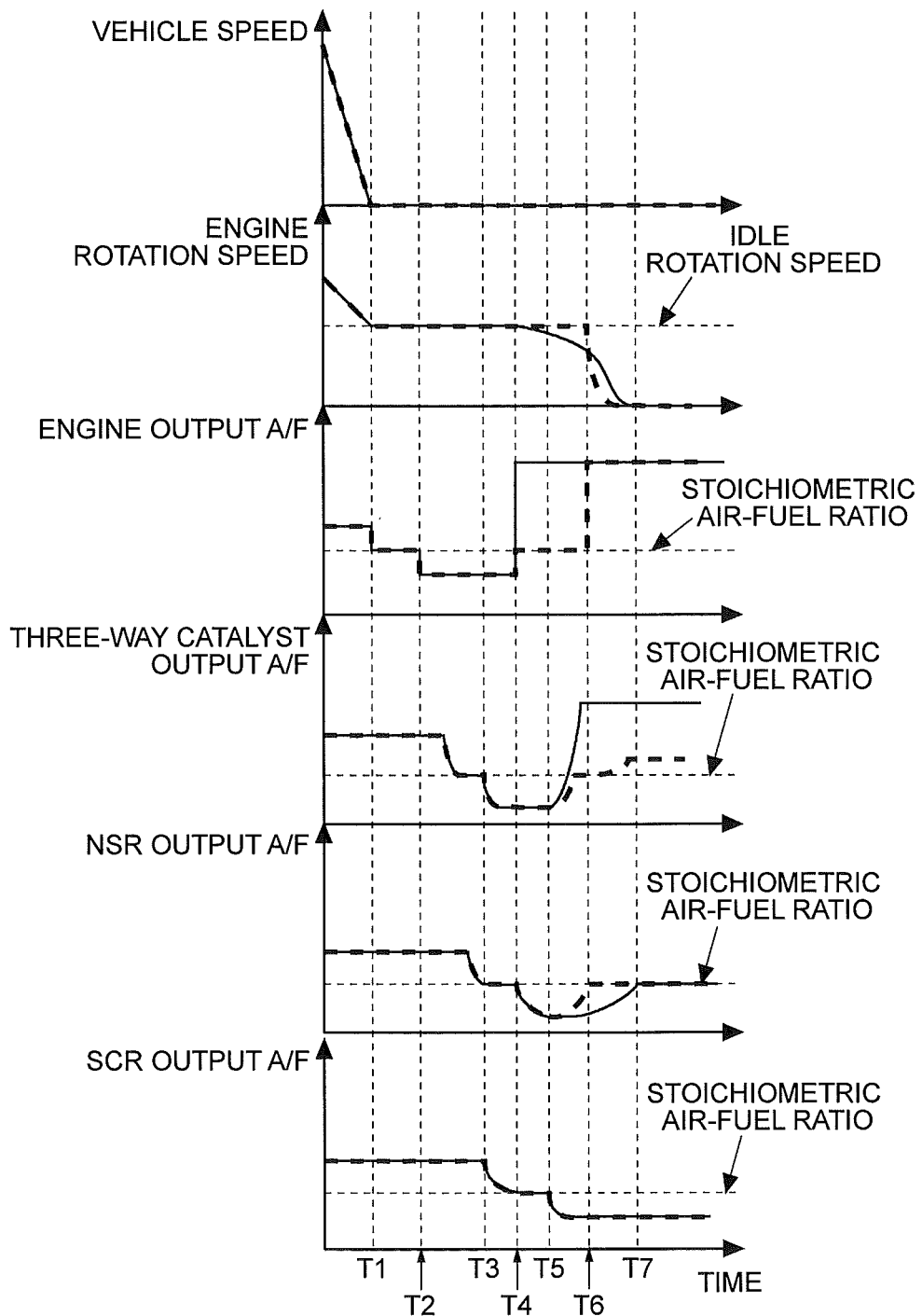
FIG. 10 is a time chart that shows changes in various numeric values at the time of a stop of the internal combustion engine.
Figure 11:
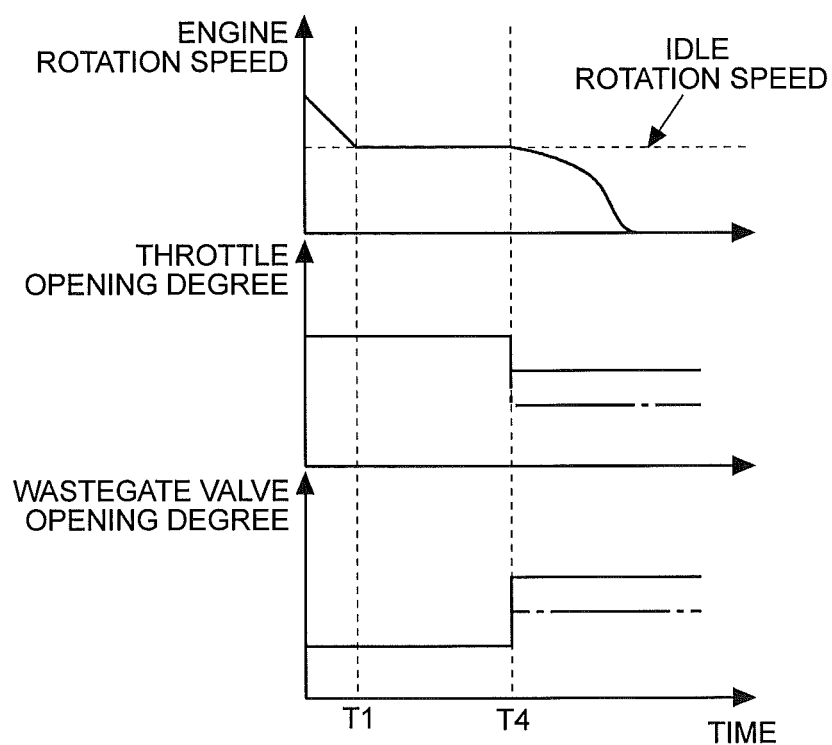
FIG. 11 is a time chart that shows changes in engine rotation speed, throttle opening degree and wastegate valve opening degree at the time of a stop of the internal combustion engine.

FIG. 10 is a time chart that shows changes in various numeric values at the time of a stop of the internal combustion engine 1. The continuous lines indicate the case where control according to the present embodiment is executed. The dashed lines indicate the case where control according to the third embodiment is executed. The continuous lines and the dashed lines take the same paths until T4. FIG. 11 is a time chart that shows changes in engine rotation speed, throttle opening degree and wastegate valve opening degree at the time of a stop of the internal combustion engine 1. In FIG. 11, in the throttle opening degree and the wastegate valve opening degree, the continuous lines indicate the case where the required pumping loss is small, and the alternate long and short dashes lines indicate that the required pumping loss is large. Like signs T1 to T6 in FIG. 10 and FIG. 11 denote the same times as those in FIG. 6.

When the SCR output A/F becomes the stoichiometric air-fuel ratio at T4, supply of fuel to the internal combustion engine 1 is stopped in the present embodiment. Thus, the rotation speed of the internal combustion engine 1 decreases after T4; however, at least one of the opening degree of the throttle 16, the open/close timing of the intake valve 5, the open/close timing of the exhaust valve 9 and the opening degree of the wastegate valve 54 is set in response to the required pumping loss. Thus, the degree of decrease in engine rotation speed is adjusted, so the amount of air that is emitted to the exhaust pipe 72 is also adjusted. The pumping loss may be adjusted at T4 or may be adjusted before T4 or after T4. For example, when the hydraulic pressure that is generated with the use of the internal combustion engine 1 is required or the power of the internal combustion engine 1 is required in order to adjust the pumping loss, the pumping loss may be adjusted while fuel is supplied to the internal combustion engine 1. That is, even when the SCR output A/F becomes the stoichiometric air-fuel ratio, fuel for adjusting the pumping loss may be supplied.

At time T7 at which the rotation speed of the internal combustion engine 1 becomes zero, the NSR output A/F is the stoichiometric air-fuel ratio. At T7, the three-way catalyst 31 is almost filled with air, and the three-way catalyst output A/F is higher than the stoichiometric air-fuel ratio. On the other hand, at T7, air has not reached the SCR catalyst 33, so the SCR output A/F is a rich air-fuel ratio.

Figure 12:
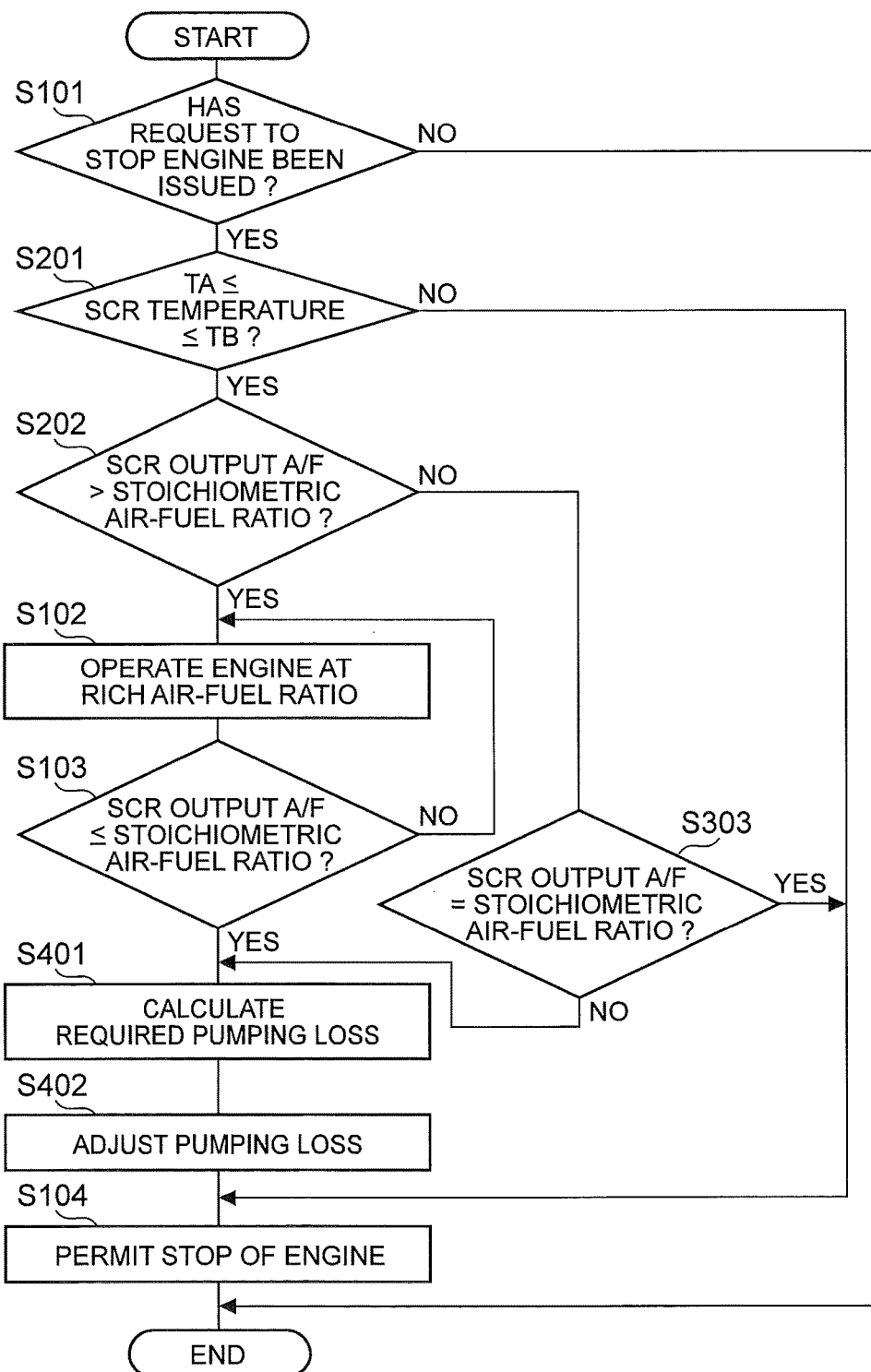
FIG. 12 is a flowchart of control at the time of a stop of the internal combustion engine according to the fourth embodiment.

FIG. 12 is a flowchart of control at the time of a stop of the internal combustion engine 1 according to the present embodiment. The flowchart is executed by the ECU 90 at predetermined time intervals during operation of the internal combustion engine 1. Like step numbers denote steps of the same processes as those of the steps of the above-described flowchart, and the description thereof is omitted. In the present embodiment, the ECU 90 that processes the flowchart corresponds to an engine stop control unit in an embodiment of the present invention.

In the flowchart shown in FIG. 12, when affirmative determination is made in step S103 or when negative determination is made in step S303, the process proceeds to step S401. In step S401, the required pumping loss is calculated. The required pumping loss is calculated on the basis of FIG. 9 from the coolant temperature and predetermined air amount of the internal combustion engine 1. In step S402, the pumping loss is adjusted such that the required pumping loss that is calculated in step S401 is equal to an actual pumping loss. After that, the process proceeds to step S104. As in the case of the first embodiment, at least one of step S201 and step S202 may be omitted. When step S202 is omitted, step S303 may also be omitted.

Incidentally, the friction loss can change depending on the individual difference, aged degradation, and the like, of each device. Thus, even when the required pumping loss is obtained in accordance with the relationship shown in FIG. 9, obtained in advance, the obtained required pumping loss may deviate from an actually required pumping loss. In the present embodiment, after the pumping loss is adjusted, the air-fuel ratio in each catalyst may be detected, and the required pumping loss may be corrected on the basis of the detected results.

For example, after the rotation speed of the internal combustion engine 1 becomes zero, when the air-fuel ratio in the SCR catalyst 33 is a lean air-fuel ratio, air is emitted from the internal combustion engine 1 more than necessary after supply of fuel to the internal combustion engine 1 is stopped. In this case, it is possible to stop the internal combustion engine 1 earlier by correcting the required pumping loss such that the required pumping loss becomes larger, so it is possible to suppress a situation that the air-fuel ratio in the SCR catalyst 33 becomes a lean air-fuel ratio. For example, the required pumping loss may be corrected by multiplying the required pumping loss by a predetermined coefficient or the required pumping loss may be corrected in response to an air-fuel ratio that is detected by the fourth air-fuel ratio sensor 94.

After the rotation speed of the internal combustion engine 1 becomes zero, when the air-fuel ratio in the three-way catalyst 31 is lower than or equal to the stoichiometric air-fuel ratio, the amount of air emitted from the internal combustion engine 1 after supply of fuel to the internal combustion engine 1 is stopped is deficient. In this case, the internal combustion engine 1 is allowed to be rotated longer by correcting the required pumping loss such that the required pumping loss becomes smaller, so it is possible to bring the air-fuel ratio in the three-way catalyst 31 to a lean air-fuel ratio. For example, the required pumping loss may be corrected by multiplying the required pumping loss by a predetermined coefficient or the required pumping loss may be corrected in response to an air-fuel ratio that is detected by the second air-fuel ratio sensor 92.

In addition, after the rotation speed of the internal combustion engine 1 becomes zero, when the air-fuel ratio in the NSR catalyst 32 is a lean air-fuel ratio, the amount of air emitted from the internal combustion engine 1 after supply of fuel to the internal combustion engine 1 is stopped is deficient. In this case, the internal combustion engine 1 is allowed to be rotated longer by correcting the required pumping loss such that the required pumping loss becomes smaller, so it is possible to bring the air-fuel ratio in the NSR catalyst 32 to the stoichiometric air-fuel ratio or higher. For example, the required pumping loss may be corrected by multiplying the required pumping loss by a predetermined coefficient or the required pumping loss may be corrected in response to an air-fuel ratio that is detected by the third air-fuel ratio sensor 93.

Figure 13:
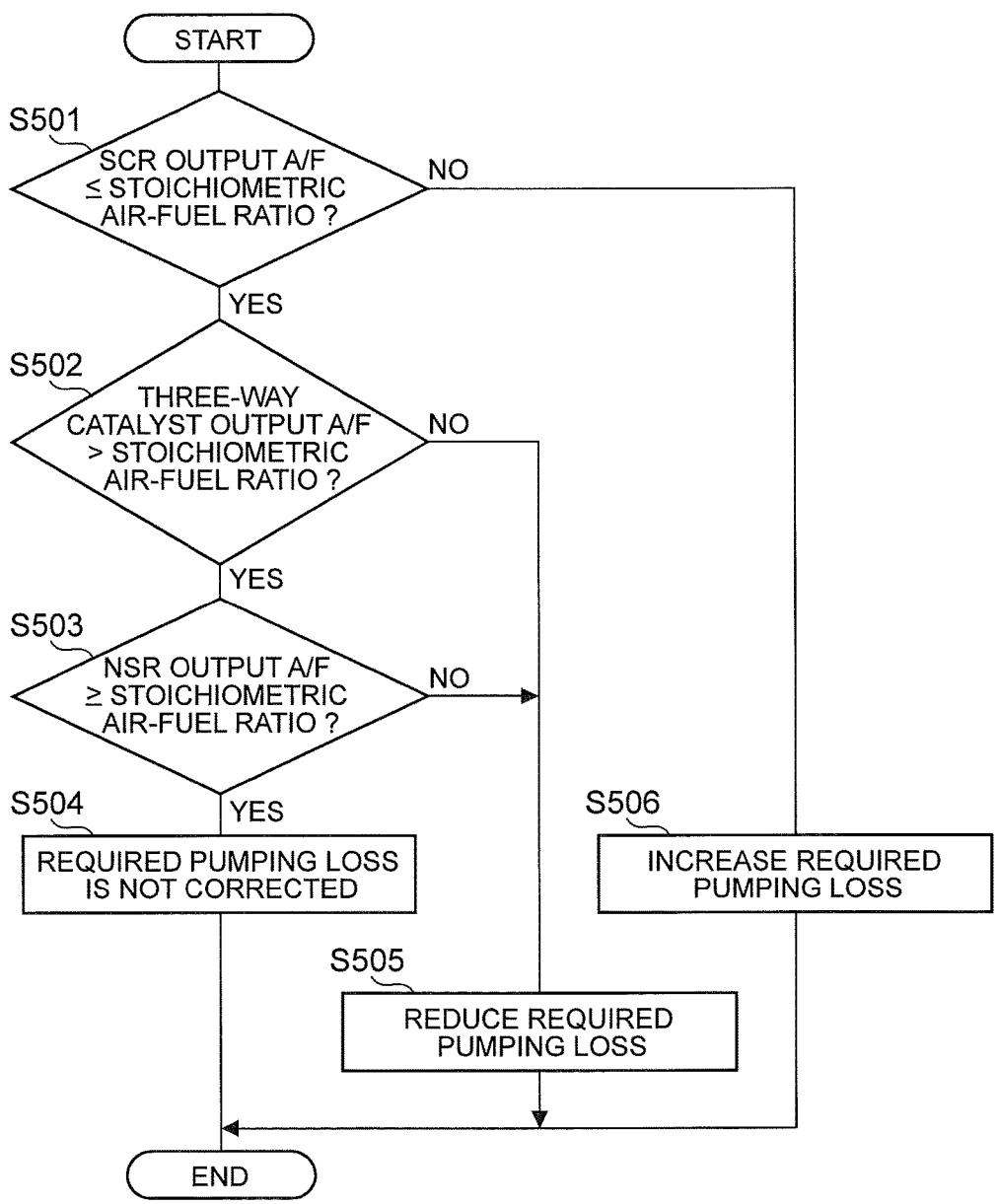
FIG. 13 is a flowchart for correcting a required pumping loss.

FIG. 13 is a flowchart for correcting a required pumping loss. The flowchart is started at the time when the rotation speed of the internal combustion engine 1 becomes zero.

In step S501, it is determined whether the SCR output A/F is lower than or equal to the stoichiometric air-fuel ratio. In this step, it is determined whether the air-fuel ratio in the SCR catalyst 33 is an appropriate value through stop control. When affirmative determination is made in step S501, the process proceeds to step S502. On the other hand, when negative determination is made in step S501, the process proceeds to step S506, and the pumping loss is increased.

In step S502, it is determined whether the three-way catalyst output A/F is higher than the stoichiometric air-fuel ratio. In this step, it is determined whether the air-fuel ratio in the three-way catalyst 31 is an appropriate value through stop control. When affirmative determination is made in step S502, the process proceeds to step S503. On the other hand, when negative determination is made in step S502, the process proceeds to step S505, and the pumping loss is reduced.

In step S503, it is determined whether the NSR output A/F is higher than or equal to the stoichiometric air-fuel ratio. In this step, it is determined whether the air-fuel ratio in the NSR catalyst 32 is an appropriate value through stop control. When affirmative determination is made in step S503, the process proceeds to step S504. On the other hand, when negative determination is made in step S503, the process proceeds to step S505, and the pumping loss is reduced.

In step S504, it is presumable that the required pumping loss is an appropriate value, so the flowchart is ended without correcting the required pumping loss.

As described above, according to the present embodiment, it is not required to supply fuel to the internal combustion engine 1 for the purpose of suppressing hydrocarbon poisoning in the three-way catalyst 31 and the NSR catalyst 32, so it is possible to reduce the consumption of fuel.

What is claimed is:

1. An exhaust gas control system for an internal combustion engine operable at a lean air-fuel ratio, the exhaust gas control system comprising:
    an NOx selective catalytic reduction catalyst provided in an exhaust passage of the internal combustion engine, the NOx selective catalytic reduction catalyst being configured to adsorb ammonia and reduce NOx with the use of the adsorbed ammonia as a reducing agent; and
    an electronic control unit configured to
    i) change an air-fuel ratio in the internal combustion engine,
    ii) after a request to stop the internal combustion engine has been issued, until an air-fuel ratio in the NOx selective catalytic reduction catalyst becomes lower than or equal to a stoichiometric air-fuel ratio, operate the internal combustion engine at the stoichiometric air-fuel ratio or lower before stopping the internal combustion engine, and
    iii) after that, execute stop control that is control for stopping supply of fuel to the internal combustion engine.

2. The exhaust gas control system according to claim 1, further comprising:
    an upstream catalyst provided in the exhaust passage at a portion upstream of the NOx selective catalytic reduction catalyst, the upstream catalyst being a catalyst of which exhaust gas purification performance decreases because of hydrocarbon poisoning, wherein
    the electronic control unit is configured to
    i) in the stop control, until the air-fuel ratio in the NOx selective catalytic reduction catalyst becomes lower than or equal to the stoichiometric air-fuel ratio, operate the internal combustion engine at the stoichiometric air-fuel ratio or lower,
    ii) after that, until an air-fuel ratio in the upstream catalyst becomes higher than or equal to the stoichiometric air-fuel ratio while the air-fuel ratio in the NOx selective catalytic reduction catalyst remains at the stoichiometric air-fuel ratio or lower, operate the internal combustion engine at the stoichiometric air-fuel ratio or higher, and
    iii) after that, stop supply of fuel to the internal combustion engine.

3. The exhaust gas control system according to claim 1, further comprising:
    an upstream catalyst provided in the exhaust passage at a portion upstream of the NOx selective catalytic reduction catalyst, the upstream catalyst being a catalyst of which exhaust gas purification performance decreases because of hydrocarbon poisoning, wherein the electronic control unit is configured to adjust a pumping loss of the internal combustion engine such that, in the stop control, a total intake air amount of the internal combustion engine in a period from when supply of fuel to the internal combustion engine is stopped to when a rotation speed of the internal combustion engine becomes zero becomes a predetermined air amount, the predetermined air amount being a total intake air amount that is required to bring an air-fuel ratio in the upstream catalyst to the stoichiometric air-fuel ratio or higher while the air-fuel ratio in the NOx selective catalytic reduction catalyst remains lower than or equal to the stoichiometric air-fuel ratio.

4. The exhaust gas control system according to claim 3, wherein
the electronic control unit is configured to set the pumping loss such that the pumping loss at the time when the predetermined air amount is small is larger than the pumping loss at the time when the predetermined air amount is large.

5. The exhaust gas control system according to claim 3, wherein
the electronic control unit is configured to set the pumping loss such that the pumping loss at the time when a temperature of the internal combustion engine is high is larger than the pumping loss at the time when the temperature of the internal combustion engine is low.

6. The exhaust gas control system according to claim 2, wherein
the upstream catalyst includes at least one of a three-way catalyst and an NOx storage reduction catalyst,
the three-way catalyst is a catalyst that is provided in the exhaust passage of the internal combustion engine and that has an oxygen storage capability, and
the NOx storage reduction catalyst is a catalyst that is provided in the exhaust passage at a portion downstream of the three-way catalyst, that stores NOx when the air-fuel ratio in the NOx storage reduction catalyst is a lean air-fuel ratio, and that reduces NOx when the air-fuel ratio in the NOx storage reduction catalyst is lower than or equal to the stoichiometric air-fuel ratio.

7. The exhaust gas control system according to claim 3, wherein
the upstream catalyst includes at least one of a three-way catalyst and an NOx storage reduction catalyst,
the three-way catalyst is a catalyst that is provided in the exhaust passage of the internal combustion engine and that has an oxygen storage capability, and
the NOx storage reduction catalyst is a catalyst that is provided in the exhaust passage at a portion downstream of the three-way catalyst, that stores NOx when the air-fuel ratio in the NOx storage reduction catalyst is a lean air-fuel ratio, and that reduces NOx when the air-fuel ratio in the NOx storage reduction catalyst is lower than or equal to the stoichiometric air-fuel ratio.

8. The exhaust gas control system according to claim 1, wherein
the electronic control unit is configured to, when a request to stop the internal combustion engine has been issued and when a condition for self-consumption of ammonia adsorbed in the NOx selective catalytic reduction catalyst is satisfied, execute the stop control.

9. The exhaust gas control system according to claim 8, further comprising:
an air-fuel ratio detection unit configured to detect or estimate the air-fuel ratio in the NOx selective catalytic reduction catalyst, wherein
the electronic control unit is configured to, when the air-fuel ratio detected or estimated by the air-fuel ratio detection unit is a lean air-fuel ratio, determine that the condition for self-consumption of ammonia adsorbed in the NOx selective catalytic reduction catalyst is satisfied.

10. The exhaust gas control system according to claim 8, further comprising:
a temperature detection unit configured to detect or estimate a temperature in the NOx selective catalytic reduction catalyst, wherein
the electronic control unit is configured to, when the temperature detected or estimated by the temperature detection unit is higher than or equal to a lower limit temperature, determine that the condition for self-consumption of ammonia adsorbed in the NOx selective catalytic reduction catalyst is satisfied, and
the lower limit temperature is a temperature at which self-consumption of ammonia adsorbed in the NOx selective catalytic reduction catalyst begins.

11. The exhaust gas control system according to claim 8, further comprising:
a temperature detection unit configured to detect or estimate a temperature in the NOx selective catalytic reduction catalyst,
the electronic control unit is configured to, when the temperature detected or estimated by the temperature detection unit is lower than an upper limit temperature, determine that the condition for self-consumption of ammonia adsorbed in the NOx selective catalytic reduction catalyst is satisfied, and
the upper limit temperature is an upper limit value of a temperature at which ammonia remains in the NOx selective catalytic reduction catalyst.

* * * * *